United States Patent
Amidon et al.

(10) Patent No.: US 10,218,733 B1
(45) Date of Patent: *Feb. 26, 2019

(54) SYSTEM AND METHOD FOR DETECTING A MALICIOUS ACTIVITY IN A COMPUTING ENVIRONMENT

(71) Applicant: Awake Networks, Inc., Mountain View, CA (US)

(72) Inventors: Keith Amidon, Los Altos, CA (US); Debabrata Dash, San Jose, CA (US); Gary Golomb, Los Gatos, CA (US); David Pearson, Fairport, NY (US)

(73) Assignee: AWAKE SECURITY, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,513

(22) Filed: Jun. 11, 2017

Related U.S. Application Data

(63) Continuation-in-part of application No. 15/042,135, filed on Feb. 11, 2016.

(51) Int. Cl.
*G06F 12/14* (2006.01)
*H04L 29/06* (2006.01)

(52) U.S. Cl.
CPC ...... *H04L 63/1425* (2013.01); *H04L 63/1416* (2013.01); *H04L 63/1441* (2013.01)

(58) Field of Classification Search
USPC ....................................... 726/22–26; 713/188
See application file for complete search history.

(56) References Cited

U.S. PATENT DOCUMENTS

| | | | | |
|---|---|---|---|---|
| 7,609,629 B2 * | 10/2009 | Watanabe | ............... | H04L 43/00 370/230 |
| 8,776,229 B1 * | 7/2014 | Aziz | ................... | H04L 63/1425 713/176 |
| 8,789,173 B2 * | 7/2014 | Narayanaswamy | ........................ | H04L 63/1458 709/224 |
| 8,914,878 B2 * | 12/2014 | Burns | ................. | H04L 63/1441 726/13 |
| 9,521,162 B1 * | 12/2016 | Zand | ................... | H04L 63/1441 |
| 9,749,340 B2 * | 8/2017 | Huston, III | ......... | H04L 63/1416 |
| 2005/0198099 A1 * | 9/2005 | Motsinger | ............... | G06F 21/55 709/200 |
| 2009/0276852 A1 * | 11/2009 | Alderson | .............. | H04L 63/145 726/23 |
| 2009/0293122 A1 * | 11/2009 | Abdel-Aziz | ........ | H04L 63/1416 726/23 |
| 2010/0115621 A1 * | 5/2010 | Staniford | ............ | H04L 63/1416 726/25 |
| 2010/0169971 A1 * | 7/2010 | Raviv | ................... | G06F 21/316 726/23 |

(Continued)

*Primary Examiner* — Amare F Tabor
(74) *Attorney, Agent, or Firm* — Minisandram Law Firm; Raghunath S. Minisandram

(57) ABSTRACT

System and method for evaluating communication between a plurality of computing devices is disclosed. A plurality of communication between a user computer and at least one a destination computer is monitored by a security appliance. Selective information from the plurality of communication is extracted by the security appliance. Extracted selective information between a pair of communication is compared for a match. An activity record is generated for the user computer and at least one destination computer, based on the match.

20 Claims, 26 Drawing Sheets

(56) References Cited

U.S. PATENT DOCUMENTS

2015/0230091 A1* 8/2015 Sahu .................. H04L 43/18
　　　　　　　　　　　　　　　　　　455/410
2015/0264078 A1* 9/2015 Beauchesne ........ H04L 63/1441
　　　　　　　　　　　　　　　　　　726/23

* cited by examiner

| TIME | SOURCE IP | DESTINATION IP | Event | |
|---|---|---|---|---|
| T11 | | | Start DHCP session S1 | 410 |
| T11 | | | S1: DHCP request IP addr | 412 |
| T12 | 2.2.2.2 | 1.1.1.1 | S1: DHCP reply, ip=1.1.1.1 name="first user computer" | 414 |
| T12 | | | Record in knowledge graph device "first user computer" using IP 1.1.1.1 at time T12 derived from session S1 | 416 |
| T12 | 1.1.1.1 | 2.2.2.2 | End session S1 | 418 |
| T12 | | | Record connection record for session S1: 1.1.1.1 -> 2.2.2.2 sent 1 pkt totaling 100 bytes, received 1 pkt totaling 500 bytes. | 420 |
| T49 | | | Start DHCP session S2 | 422 |
| T49 | 1.1.1.2 | 2.2.2.2 | S2: DHCP renew IP address 1.1.1.2, name="second user Computer" | |
| T50 | 2.2.2.2 | 1.1.1.2 | S2: DHCP acknowledge | |
| T50 | | | Record in knowledge graph device "second user computer" using IP 1.1.1.2 at time T50 derived from session S2 | 426 |
| T50 | 1.1.1.2 | 2.2.2.2 | End session S2 | |
| T50 | | | Record connection record for session S2: 1.1.1.2 -> 2.2.2.2 sent 1 pkt totaling 100 bytes, received 1 pkt totaling 500 bytes. | 424 |

FIGURE 4A

| TIME | SOURCE IP | DESTINATION IP | Event |
|---|---|---|---|
| T50 | 1.1.1.2 | 103.4.4.4 | Start HTTP session S3 |
| T50 | 1.1.1.2 | 200.1.1.1 | Start UNKNOWN TCP port 8281 protocol session S4 |
| T50 | 1.1.1.2 | 200.1.1.1 | S4: unknown data transfer of 50 bytes |
| T50 | | | Record indicator "unknown protocol" in session S4. |
| T51 | 1.1.1.2 | 103.4.4.4 | S3:HTTP request GET /update |
| T51 | 103.4.4.4 | 1.1.1.2 | S3:HTTP reply, empty |
| T51 | 200.1.1.1 | 1.1.1.2 | S4: unknown data transfer of 20 bytes |
| T51 | | | Record in knowledge graph device "second user computer" booted, derived from session S3 due to onboot update of an application on the machine. |
| T51 | | | Record indicator "on system boot" in session S4 |
| T51 | 1.1.1.2 | 200.1.1.1 | End session S4 |
| T51 | | | Record connection record for session S4: 1.1.1.2 -> 200.1.1.1 sent 1 pkt totaling 70 bytes, received 1 pkt totaling 50 bytes. |
| T51 | 1.1.1.2 | 103.4.4.4 | End of session S3 |
| T51 | | | Record connection record for session S3: 1.1.1.2 -> 103.4.4.4 sent 5 pkt totaling 200 bytes, received 4 pkt totaling 150 bytes. |

FIGURE 4B

| TIME | SOURCE IP | DESTINATION IP | Event | |
|------|-----------|----------------|-------|---|
| T51 | 1.1.1.1 | 101.2.2.2 | Start HTTP session S5 to obscuresite.com | ← 440 |
| T52 | 1.1.1.1 | 101.2.2.2 | S5: HTTP Request GET /home | |
| T53 | 101.2.2.2 | 1.1.1.1 | S5: HTTP Response OK with HTML file | |
| T53 | | | Add file /home from obscuresite.com to object store associated with device "first user computer" | ← 444 |
| T54 | 1.1.1.1 | 101.2.2.2 | End session 5 | |
| T54 | | | Record connection record for session S5: 1.1.1.1 -> 101.2.2.2 sent 3 pkt totaling 200 bytes, received 4 pkt totaling 150 bytes. | ← 442 |
| T60 | | | Start DHCP session S6 | ← 446 |
| T60 | | | S6: DHCP renew IP 1.1.1.1 | |
| T61 | | | S6: DHCP reject 1.1.1.1 | |
| T62 | | | S6: DHCP request IP | |
| T63 | 2.2.2.2 | 3.3.3.3 | S6: DHCP reply ip=3.3.3.3 name="first user computer" | |
| T63 | 2.2.2.2 | 3.3.3.3 | Record in knowledge graph device "first user computer" now using IP 3.3.3.3 | ← 450 |
| T63 | 3.3.3.3 | 2.2.2.2 | End session S6 | |
| T63 | | | Record connection record for session S6: 3.3.3.3 -> 2.2.2.2 sent 1 pkt totaling 100 bytes, received 1 pkt totaling 500 bytes. | ← 448 |

FIGURE 4C

| TIME | SOURCE IP | DESTINATION IP | Event |
|---|---|---|---|
| T65 | 3.3.3.3 | 102.3.3.3 | Start HTTP session S7 to google.com |
| T65 | 3.3.3.3 | 102.3.3.3 | S7: HTTP GET /image |
| T66 | 102.3.3.3 | 3.3.3.3 | S7: HTTP Response OK with file |
| T66 | | | Add file /image from google.com to object store associated with "first user computer". |
| T66 | 3.3.3.3 | 102.3.3.3 | End session S7 |
| T66 | | | Record connection record for session S7: 3.3.3.3 -> 102.3.3.3 sent 1 pkt totaling 100 bytes, received 1 pkt totaling 500 bytes. |

FIGURE 4D

| TIME | SOURCE IP | DESTINATION IP | Event | |
|---|---|---|---|---|
| T70 | 3.3.3.3 | 2.2.2.30 | Start IM session S8 | ←458 |
| T71 | 3.3.3.3 | 2.2.2.30 | S8: IM registration request for first user | |
| T72 | 2.2.2.30 | 3.3.3.3 | S8: IM registration acknowledge for "first user" | |
| T72 | | | Record in knowledge graph "first user" associated with "first user computer". | ←460 |
| T99 | | | Start DHCP session S9 | ←462 |
| T99 | 1.1.1.2 | 2.2.2.2 | S9: DHCP renew IP address 1.1.1.2, name="second user computer" | |
| T100 | 2.2.2.2 | 1.1.1.2 | S9: DHCP acknowledge | |
| T100 | | | Record in knowledge graph device "second user computer" using IP 1.1.1.2 at time T50 derived from session S9 | ←466 |
| T100 | 1.1.1.2 | 2.2.2.2 | End session S9 | |
| T100 | | | Record connection record for session S9: 1.1.1.2 -> 2.2.2.2 sent 1 pkt totaling 100 bytes, received 1 pkt totaling 500 bytes. | ←464 |

FIGURE 4E

| TIME | SOURCE IP | DESTINATION IP | Event | |
|---|---|---|---|---|
| T100 | 1.1.1.2 | 103.4.4.4 | Start HTTP session S10 | — 468 |
| T100 | 1.1.1.2 | 200.1.1.1 | Start UNKNOWN TCP port 8281 protocol session S11 | |
| T100 | 1.1.1.2 | 200.1.1.1 | S11: unknown data transfer of 50 bytes | — 472 |
| T100 | | | Record indicator "unknown protocol" in session S11. | |
| T101 | 1.1.1.2 | 103.4.4.4 | S10: HTTP request GET /update | |
| T101 | 103.4.4.4 | 1.1.1.2 | S10: HTTP reply, empty | |
| T101 | 200.1.1.1 | 1.1.1.2 | S11: unknown data transfer of 20 bytes | |
| T101 | | | Record in knowledge graph device "second user computer" booted, derived from session S10 due to onboot update of an application on the machine. | — 474 |
| T101 | | | Record indicator "on system boot" in session S11 | — 476 |
| T101 | 1.1.1.2 | 200.1.1.1 | End session S11 | |
| T101 | | | Record connection record for session S11: 1.1.1.2 -> 200.1.1.1 sent 1 pkt totaling 70 bytes, received 1 pkt totaling 50 bytes. | — 478 |
| T101 | 1.1.1.2 | 103.4.4.4 | End of session S10 | |
| T101 | | | Record connection record for session S10: 1.1.1.2 -> 103.4.4.4 sent 5 pkt totaling 200 bytes, received 4 pkt totaling 150 bytes. | — 470 |

FIGURE 4F

| TIME | SOURCE IP | DESTINATION IP | Event |
|---|---|---|---|
| T101 | 1.1.1.2 | 2.2.2.30 | Start IM session S12 |
| T101 | 1.1.1.2 | 2.2.2.30 | S12: IM registration request for second user on second user computer |
| T101 | 2.2.2.30 | 1.1.1.2 | S12: IM registration acknowledge for second user on second user computer |
| T101 | | | Record in knowledge graph "second user" associated with "second user computer". |
| T101 | 3.3.3.3 | 2.2.2.30 | S8: IM message to "first user": can you send... |
| T102 | 1.1.1.2 | 2.2.2.30 | S12: IM message from "second user": can you send... |
| T113 | 1.1.1.2 | 2.2.2.30 | S12: IM message to "first user": please review this link |
| T113 | 2.2.2.30 | 3.3.3.3 | S8: IM message from "second user": please review this link |
| T113 | 3.3.3.3 | 201.2.2.2 | Start HTTP session S13 with IP 201.2.2.2 |
| T113 | 3.3.3.3 | 201.2.2.2 | S13: HTTP request GET /.php |
| T113 | 201.2.2.2 | 3.3.3.3 | S13: Receive file |
| T113 | | | Add file /.php from IP 201.2.2.2 to object store |
| T113 | | | Record indicator "exploit code received" on session S13 and file added to object store |
| T114 | 3.3.3.3 | 201.2.2.2 | End session 13 |
| T114 | | | Record connection record for session S13: 3.3.3.3 -> 201.2.2.2 sent 4 pkt totaling 200 bytes, received 10 pkt totaling 200,000 bytes. |
| T115 | | | Record indicator "code not executed" on session S13 derived from fact that IP 3.3.3.3 did not make a certificate revocation check to Microsoft within a two time-unit timeout to verify the certificate on the exploit code. |

FIGURE 4G

| TIME | SESSION | DEVICE IP | DEVICE ENTITY | USER ENTITY | RELATIONSHIP |
|---|---|---|---|---|---|
| T12 | S1 | 1.1.1.1 | FIRST USER COMPUTER | | IP ASSIGNED |
| T50 | S2 | 1.1.1.2 | SECOND USER COMPUTER | | IP ASSIGNED |
| T51 | S3 | 1.1.1.2 | SECOND USER COMPUTER | | SYSTEM BOOTED |
| T63 | S6 | 3.3.3.3 | FIRST USER COMPUTER | | IP ASSIGNED |
| T72 | S8 | | FIRST USER COMPUTER | FIRST USER | DEVICE-USER |
| T100 | S9 | 1.1.1.2 | SECOND USER COMPUTER | | IP RENEWED |
| T101 | S10 | 1.1.1.2 | SECOND USER COMPUTER | | SYSTEM BOOTED |
| T101 | S12 | | SECOND USER COMPUTER | SECOND USER | DEVICE-USER |

FIGURE 5

| TIME RANGE | SESSION | SOURCE IP | DESTINATION IP | PROTOCOL | META DATA |
|---|---|---|---|---|---|
| T11-T12 | S1 | 1.1.1.1 | 2.2.2.2 | DHCP | 1 packet sent 100 bytes<br>1 packet received 500 bytes |
| T49-T50 | S2 | 1.1.1.2 | 2.2.2.2 | DHCP | 1 packet sent 100 bytes<br>1 packet received 500 bytes |
| T50-T51 | S3 | 1.1.1.2 | 103.4.4.4 | HTTP | 5 packets sent 200 bytes<br>4 packets received 150 bytes |
| T50-T51 | S4 | 1.1.1.2 | 200.1.1.1 | UNKNOWN | 1 packet sent 70 bytes<br>1 packet received 50 bytes |
| T51-T54 | S5 | 1.1.1.1 | 101.2.2.2 | HTTP | 5 packets sent 200 bytes<br>4 packets received 150 bytes |
| T60-T63 | S6 | 3.3.3.3 | 2.2.2.2 | DHCP | 1 packet sent 100 bytes<br>1 packet received 500 bytes |
| T65-T66 | S7 | 3.3.3.3 | 102.3.3.3 | HTTP | 1 packet sent 100 bytes<br>1 packet received 500 bytes |
| T99-T100 | S9 | 1.1.1.2 | 2.2.2.2 | DHCP | 1 packet sent 100 bytes<br>1 packet received 500 bytes |
| T100-T101 | S11 | 1.1.1.2 | 200.1.1.1 | UNKNOWN | 1 packet sent 70 bytes<br>1 packet received 50 bytes |
| T100-T101 | S10 | 1.1.1.2 | 103.4.4.4 | HTTP | 5 packets sent 200 bytes<br>4 packets received 150 bytes |
| T113-T114 | S13 | 3.3.3.3 | 201.2.2.2 | HTTP | 4 packets sent 200 bytes<br>10 packets received 200,000 bytes |

FIGURE 6

| TIME | SESSION | SOURCE IP | DESTINATION IP | INDICATOR |
|---|---|---|---|---|
| T51 | S4 | 1.1.1.2 | 200.1.1.1 | UNKNOWN PROTOCOL |
| T51 | S4 | 1.1.1.2 | | ON SYSTEM BOOT |
| T100 | S11 | 1.1.1.2 | 200.1.1.1 | UNKNOWN PROTOCOL |
| T101 | S11 | 1.1.1.2 | | ON SYSTEM BOOT |
| T113 | S13 | 201.2.2.2 | 3.3.3.3 | EXPLOIT CODE RECEIVED |
| T115 | S13 | 3.3.3.3 | | CODE NOT EXECUTED |

FIGURE 7

```
802 ── 01: Frame 1:
804 ── 02: Arrival Time: Jan 4, 2017 14:16:07.751848510 PST
806 ── 03: Internet Protocol Version 4, Src: 192.168.40.72, Dst: 192.168.40.1
812 ── 04: Protocol: UDP (17)
808 ── 05: User Datagram Protocol, Src Port: 45558, Dst Port: 53
810 ── 06: Domain Name System (query)
814 ── 07: Transaction ID: 0x9bb1
       08: Flags: 0x0100 Standard query
       09: Questions: 1
       10: Answer RRs: 0
       11: Queries
816 ── 12: www.pcmag.com: type A, class IN
       13: Name: www.pcmag.com
```

FIGURE 8

14: Frame 2:
15:     Arrival Time: Jan 4, 2017 14:16:07.771755233 PST
16: Protocol Version 4, Src: 192.168.40.1, Dst: 192.168.40.72
17: Protocol: UDP (17)
18: User Datagram Protocol, Src Port: 53, Dst Port: 45558
19: Domain Name System (response)
20:     Transaction ID: 0x9bb1
21:     Flags: 0x8180 Standard query response, No error
22:     Questions: 1
23:     Answer RRs: 4
24:     Queries
25:         www.pcmag.com: type A, class IN
26:             Name: www.pcmag.com
27:     Answers
28:         www.pcmag.com: type CNAME, class IN, cname a003.ziffdavis.inscname.net
29:             Name: www.pcmag.com
30:             Type: CNAME (Canonical NAME for an alias) (5)
31:             Class: IN (0x0001)
32:             Time to live: 108

FIGURE 9A

33: CNAME: a003.ziffdavis.inscname.net
34: a003.ziffdavis.inscname.net: type CNAME, class IN, cname ins-062.inscname.net
35: Name: a003.ziffdavis.inscname.net
36: Type: CNAME (Canonical NAME for an alias) (5)
37: Class: IN (0x0001)
38: Time to live: 545
39: CNAME: ins-062.inscname.net
40: ins-062.inscname.net: type CNAME, class IN, cname a-sg01sl03.insnw.net
41: Name: ins-062.inscname.net
42: Type: CNAME (Canonical NAME for an alias) (5)
43: Class: IN (0x0001)
44: Time to live: 2595
45: CNAME: a-sg01sl03.insnw.net
46: a-sg01sl03.insnw.net: type A, class IN, addr 192.33.31.70
47: Name: a-sg01sl03.insnw.net
48: Type: A (Host Address) (1)
49: Class: IN (0x0001)
50: Time to live: 2604
51: Address: 192.33.31.70

FIGURE 9B

| Start Time | End Time | Source | Destination | Protos | Summary |
|---|---|---|---|---|---|
| Jan 4, 2017 14:16:07.751 848510 PST | Jan 4, 2017 14:16:07.77 1755233 PST | 192.168.40. 72:45558 John/john-tablet.acme.net | 192.168.40. 1:53 router.acme.net | IP UDP DNS | Query A www.pcmag.com <- CNAME a003.ziffdavis.inscname.net for 108s, CNAME ins-062.inscname.net for 545s, CNAME a-sg01sl03.insnw.net for 2595s, A 192.33.31.70 for 2604s |

1102 — 001: Frame 1:
1104 — 002:   Arrival Time: May 12, 2017 11:38:05.972792000 PDT
1106 — 003:   Internet Protocol Version 4, Src: 192.168.40.72, Dst: 192.168.40.197
1112 — 004:   Protocol: ICMP (1)
1108 — 005:   Internet Control Message Protocol
1110 — 006:   Type: 8 (Echo (ping) request)
1114 — 007:   Code: 0
1116 — 008:   Identifier (BE): 9643 (0x25ab)
1118 — 009:   Sequence number (BE): 1 (0x0001)
1120 — 010:   Data (753 bytes)
011: 0000  db d7 0e 00 00 00 00 00 10 11 12 13 14 15 16 17   ................
012: 0010  18 19 1a 1b 1c 1d 1e 1f 20 21 22 23 24 25 26 27   ........ !"#$%&'
013: 0020  28 29 2a 2b 2c 2d 2e 2f 30 31 32 33 34 35 36 37   ()*+,-./01234567
014: 0030  38 39 3a 3b 3c 3d 3e 3f 40 41 42 43 44 45 46 47   89:;<=>?@ABCDEFG
015: 0040  48 49 4a 4b 4c 4d 4e 4f 50 51 52 53 54 55 56 57   HIJKLMNOPQRSTUVW
016: 0050  58 59 5a 5b 5c 5d 5e 5f 60 61 62 63 64 65 66 67   XYZ[\]^_`abcdefg
017: 0060  68 69 6a 6b 6c 6d 6e 6f 70 71 72 73 74 75 76 77   hijklmnopqrstuvw
018: 0070  78 79 7a 7b 7c 7d 7e 7f 80 81 82 83 84 85 86 87   xyz{|}~.........
019: 0080  88 89 8a 8b 8c 8d 8e 8f 90 91 92 93 94 95 96 97   ................
020: 0090  98 99 9a 9b 9c 9d 9e 9f a0 a1 a2 a3 a4 a5 a6 a7   ................
021: 00a0  a8 a9 aa ab ac ad ae af b0 b1 b2 b3 b4 b5 b6 b7   ................
022: 00b0  b8 b9 ba bb bc bd be bf c0 c1 c2 c3 c4 c5 c6 c7   ................
023: 00c0  c8 c9 ca cb cc cd ce cf d0 d1 d2 d3 d4 d5 d6 d7   ................
024: 00d0  d8 d9 da db dc dd de df e0 e1 e2 e3 e4 e5 e6 e7   ................
025: 00e0  e8 e9 ea eb ec ed ee ef f0 f1 f2 f3 f4 f5 f6 f7   ................
026: 00f0  f8 f9 fa fb fc fd fe ff 00 01 02 03 04 05 06 07   ................
027: 0100  08 09 0a 0b 0c 0d 0e 0f 10 11 12 13 14 15 16 17   ................
028: 0110  18 19 1a 1b 1c 1d 1e 1f 20 21 22 23 24 25 26 27   ........ !"#$%&'
029: 0120  28 29 2a 2b 2c 2d 2e 2f 30 31 32 33 34 35 36 37   ()*+,-./01234567
030: 0130  38 39 3a 3b 3c 3d 3e 3f 40 41 42 43 44 45 46 47   89:;<=>?@ABCDEFG

031: 0140  48 49 4a 4b 4c 4d 4e 4f 50 51 52 53 54 55 56 57  HIJKLMNOPQRSTUVW
032: 0150  58 59 5a 5b 5c 5d 5e 5f 60 61 62 63 64 65 66 67  XYZ[\]^_`abcdefg
033: 0160  68 69 6a 6b 6c 6d 6e 6f 70 71 72 73 74 75 76 77  hijklmnopqrstuvw
034: 0170  78 79 7a 7b 7c 7d 7e 7f 80 81 82 83 84 85 86 87  xyz{|}~.........
035: 0180  88 89 8a 8b 8c 8d 8e 8f 90 91 92 93 94 95 96 97  ................
036: 0190  98 99 9a 9b 9c 9d 9e 9f a0 a1 a2 a3 a4 a5 a6 a7  ................
037: 01a0  a8 a9 aa ab ac ad ae af b0 b1 b2 b3 b4 b5 b6 b7  ................
038: 01b0  b8 b9 ba bb bc bd be bf c0 c1 c2 c3 c4 c5 c6 c7  ................
039: 01c0  c8 c9 ca cb cc cd ce cf d0 d1 d2 d3 d4 d5 d6 d7  ................
040: 01d0  d8 d9 da db dc dd de df e0 e1 e2 e3 e4 e5 e6 e7  ................
041: 01e0  e8 e9 ea eb ec ed ee ef f0 f1 f2 f3 f4 f5 f6 f7  ................
042: 01f0  f8 f9 fa fb fc fd fe ff 00 01 02 03 04 05 06 07  ................
043: 0200  08 09 0a 0b 0c 0d 0e 0f 10 11 12 13 14 15 16 17  ................
044: 0210  18 19 1a 1b 1c 1d 1e 1f 20 21 22 23 24 25 26 27  ........ !"#$%&'
045: 0220  28 29 2a 2b 2c 2d 2e 2f 30 31 32 33 34 35 36 37  ()*+,-./01234567
046: 0230  38 39 3a 3b 3c 3d 3e 3f 40 41 42 43 44 45 46 47  89:;<=>?@ABCDEFG
047: 0240  48 49 4a 4b 4c 4d 4e 4f 50 51 52 53 54 55 56 57  HIJKLMNOPQRSTUVW
048: 0250  58 59 5a 5b 5c 5d 5e 5f 60 61 62 63 64 65 66 67  XYZ[\]^_`abcdefg
049: 0260  68 69 6a 6b 6c 6d 6e 6f 70 71 72 73 74 75 76 77  hijklmnopqrstuvw
050: 0270  78 79 7a 7b 7c 7d 7e 7f 80 81 82 83 84 85 86 87  xyz{|}~.........
051: 0280  88 89 8a 8b 8c 8d 8e 8f 90 91 92 93 94 95 96 97  ................
052: 0290  98 99 9a 9b 9c 9d 9e 9f a0 a1 a2 a3 a4 a5 a6 a7  ................
053: 02a0  a8 a9 aa ab ac ad ae af b0 b1 b2 b3 b4 b5 b6 b7  ................
054: 02b0  b8 b9 ba bb bc bd be bf c0 c1 c2 c3 c4 c5 c6 c7  ................
055: 02c0  c8 c9 ca cb cc cd ce cf d0 d1 d2 d3 d4 d5 d6 d7  ................
056: 02d0  d8 d9 da db dc dd de df e0 e1 e2 e3 e4 e5 e6 e7  ................
057: 02e0  e8 e9 ea eb ec ed ee ef f0 f1 f2 f3 f4 f5 f6 f7  ................
058: 02f0  f8
059:

FIGURE 11B

1202 — 060: Frame 2:
1204 — 061:  Arrival Time: May 12, 2017 11:38:05.975449000 PDT
1206 — 062: Internet Protocol Version 4, Src: 192.168.40.197, Dst: 192.168.40.72
1212 — 063:  Protocol: ICMP (1)
1208 — 064: Internet Control Message Protocol
1210 — 065:  Type: 0 (Echo (ping) reply)
1214 — 066:  Code: 0
1216 — 067:  Identifier (BE): 9643 (0x25ab)
1218 — 068:  Sequence number (BE): 1 (0x0001)
069:  Data (753 bytes)
070: 0000  db d7 0e 00 00 00 00 00 10 11 12 13 14 15 16 17   ..............
071: 0010  18 19 1a 1b 1c 1d 1e 1f 20 21 22 23 24 25 26 27   ........ !"#$%&'
072: 0020  88 89 8a 8b 8c 8d 8e 8f 90 91 92 93 94 95 96 97   ..............
073: 0030  88 89 8a 8b 8c 8d 8e 8f 90 91 92 93 94 95 96 97   ..............
074: 0040  88 89 8a 8b 8c 8d 8e 8f 90 91 92 93 94 95 96 97   ..............
075: 0050  88 89 8a 8b 8c 8d 8e 8f 90 91 92 93 94 95 96 97   ..............
076: 0060  88 89 8a 8b 8c 8d 8e 8f 90 91 92 93 94 95 96 97   ..............
077: 0070  88 89 8a 8b 8c 8d 8e 8f 90 91 92 93 94 95 96 97   ..............
078: 0080  88 89 8a 8b 8c 8d 8e 8f 90 91 92 93 94 95 96 97   ..............
079: 0090  88 89 8a 8b 8c 8d 8e 8f 90 91 92 93 94 95 96 97   ..............
080: 00a0  88 89 8a 8b 8c 8d 8e 8f 90 91 92 93 94 95 96 97   ..............
081: 00b0  88 89 8a 8b 8c 8d 8e 8f 90 91 92 93 94 95 96 97   ..............
082: 00c0  88 89 8a 8b 8c 8d 8e 8f 90 91 92 93 94 95 96 97   ..............
083: 00d0  88 89 8a 8b 8c 8d 8e 8f 90 91 92 93 94 95 96 97   ..............
084: 00e0  88 89 8a 8b 8c 8d 8e 8f 90 91 92 93 94 95 96 97   ..............
085: 00f0  88 89 8a 8b 8c 8d 8e 8f 90 91 92 93 94 95 96 97   ..............
086: 0100  88 89 8a 8b 8c 8d 8e 8f 90 91 92 93 94 95 96 97   ..............
087: 0110  88 89 8a 8b 8c 8d 8e 8f 90 91 92 93 94 95 96 97   ..............
088: 0120  88 89 8a 8b 8c 8d 8e 8f 90 91 92 93 94 95 96 97   ..............
089: 0130  88 89 8a 8b 8c 8d 8e 8f 90 91 92 93 94 95 96 97   ..............
090: 0140  88 89 8a 8b 8c 8d 8e 8f 90 91 92 93 94 95 96 97   ..............

SYSTEM AND METHOD FOR DETECTING A MALICIOUS ACTIVITY IN A COMPUTING ENVIRONMENT

CROSS-REFERENCE TO RELATED APPLICATIONS

This application is a continuation-in-part of application Ser. No. 15/042,135 filed on Feb. 11, 2016, which is incorporated herein by reference, in their entirety.

TECHNICAL FIELD

The present invention relates generally to detecting a malicious activity in a computing environment and, more particularly, to detecting a malicious activity based on network communication in the computing environment.

DESCRIPTION OF RELATED ART

Detecting malicious activity in a computing environment is becoming complex. Sometimes, malicious code is downloaded on to a computing device at one instant. The malicious code remains dormant for a period of time while awaiting further command. At a later stage, additional commands are issued to the malicious code to initiate the malicious activity.

Generally, after the malicious attack has occurred and detected, a signature of the malicious code is identified. Thereafter, a malware scanner may look for a partial or full match of the identified signature of the malicious code to identify and prevent future attacks. In other words, a corrective action is taken after an attack has occurred.

It may be desirable to predict a possible malicious attack, before the attack takes place. It is with these needs in mind, this disclosure arises.

SUMMARY OF THE INVENTION

In one embodiment, a method for evaluating communication between a plurality of computing devices is disclosed. A plurality of communication between a user computer and at least one a destination computer is monitored by a security appliance. Selective information from the plurality of communication is extracted by the security appliance. Extracted selective information between a pair of communication is compared for a match. An activity record is generated for the user computer and at least one destination computer, based on the match.

In yet another embodiment, a system to evaluate communication between a plurality of computing devices is disclosed. A plurality of communication between a user computer and at least one a destination computer is monitored by a security appliance. Selective information from the plurality of communication is extracted by the security appliance. Extracted selective information between a pair of communication is compared for a match. An activity record is generated for the user computer and at least one destination computer, based on the match.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIGS. 4A, 4B, 4C, 4D, 4E, 4F and 4G shows example table showing information related to various communication events occurring between a plurality of computing devices;

FIG. 5 shows an example knowledge graph generated based on various communication events occurring between a plurality of computing devices;

FIG. 6 shows an example connection record table generated based on various communication events occurring between a plurality of computing devices;

FIG. 7 shows an example indicator table generated based on various communication events occurring between a plurality of computing devices;

FIG. 8 shows an example packet of information received by the security appliance;

FIGS. 9A and 9B show another example packet of information received by the security appliance;

FIGS. 10A and 10B show an example activity record table generated by the security appliance;

FIGS. 11A and 11B show yet another example packet of information received by the security appliance;

FIGS. 12A and 12B show yet another example packet of information received by the security appliance;

DETAILED DESCRIPTION

Figure 1:
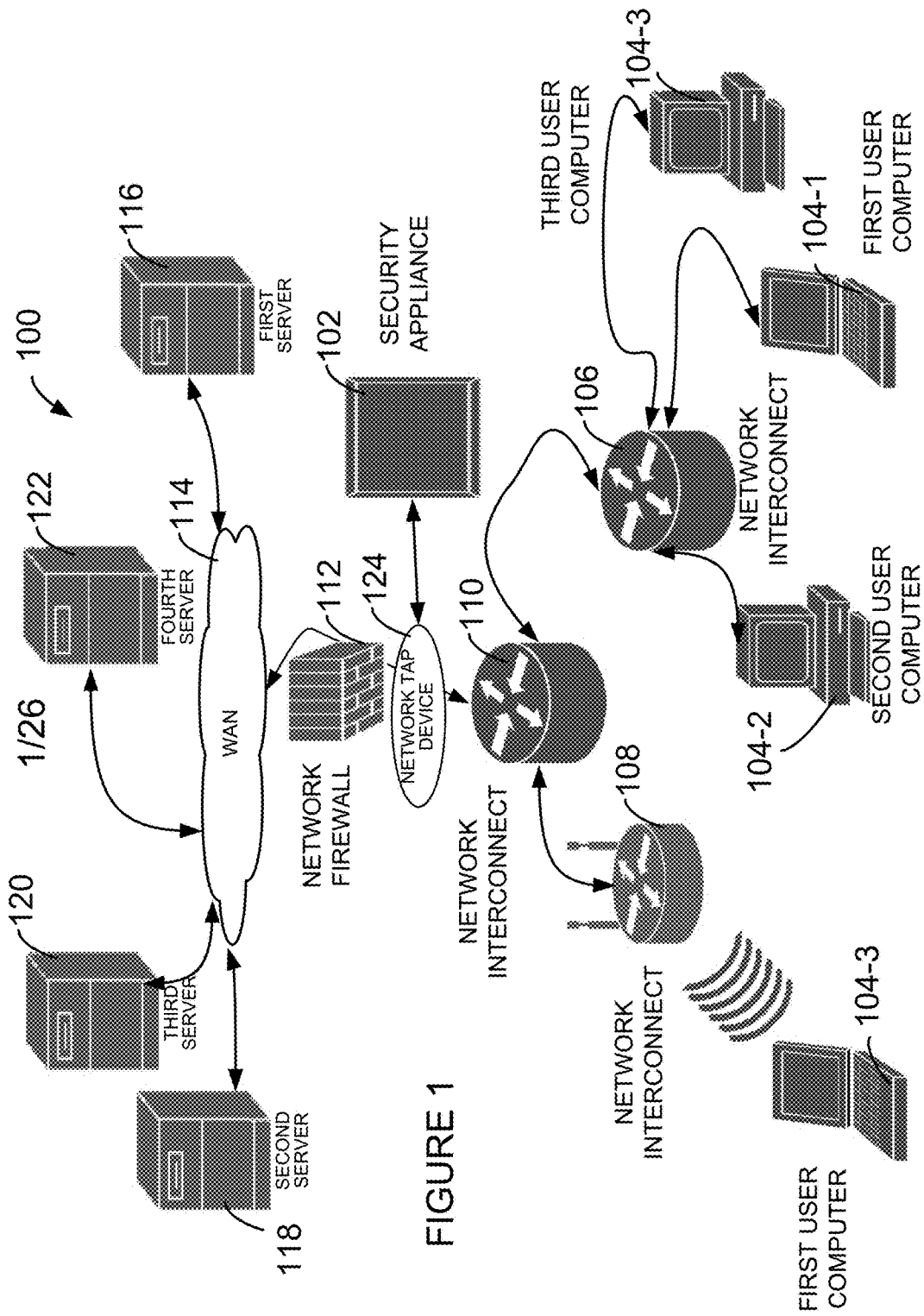
FIG. 1 shows an example computing environment with example security appliance of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for detecting a malicious activity in a computing environment. Referring now to the drawings, where similar reference characters denote corresponding features consistently throughout the figures, various examples of this disclosure is described.

FIG. 1 depicts an example computing environment 100, with a security appliance 102 of this disclosure. The computing environment 100 includes a plurality of user computers, for example, a first user computer 104-1, a second user computer 104-2 and a third user computer 104-3. The computing environment also includes a plurality of network interconnect devices 106, 108 and 110. In some examples, network interconnect device 106 may couple first user computer 104-1, second user computer 104-2 and third user computer 104-3 to form a local area network, for example, an office network. The network interconnect device 108 may be a wireless router, for example, in a conference room, that may couple one or more user computers to form another network, for example, conference room wireless network. For example, the first user computer 104-1 may also selectively couple to the network interconnect device 108, when the first user computer 104-1 is in the conference room.

The network interconnect device 110 may be configured to couple to a network firewall device 112, which may couple the network interconnect device 110 to a wide area network 114. The network interconnect device 106 and 108 may couple to network interconnect device 110 to access the wide area network 114. A plurality of servers, for example, a first server 116, a second server 118, a third server 120 and a fourth server 122 may be coupled to the wide area network 114. The plurality of servers may be accessible to the first user computer 104-1, second user computer 104-2 and the third user computer 104-3 through the network interconnect device 110.

In one example, a network tap device 124 may be disposed between the network interconnect device 110 and the firewall device 112. The network tap device 124 may be configured to intercept and forward any communication between a user computer and a server, over the wide area network 110 to the security appliance 102. Various functions and features of the security appliance 102 will now be described with reference to FIG. 2.

Figure 2:
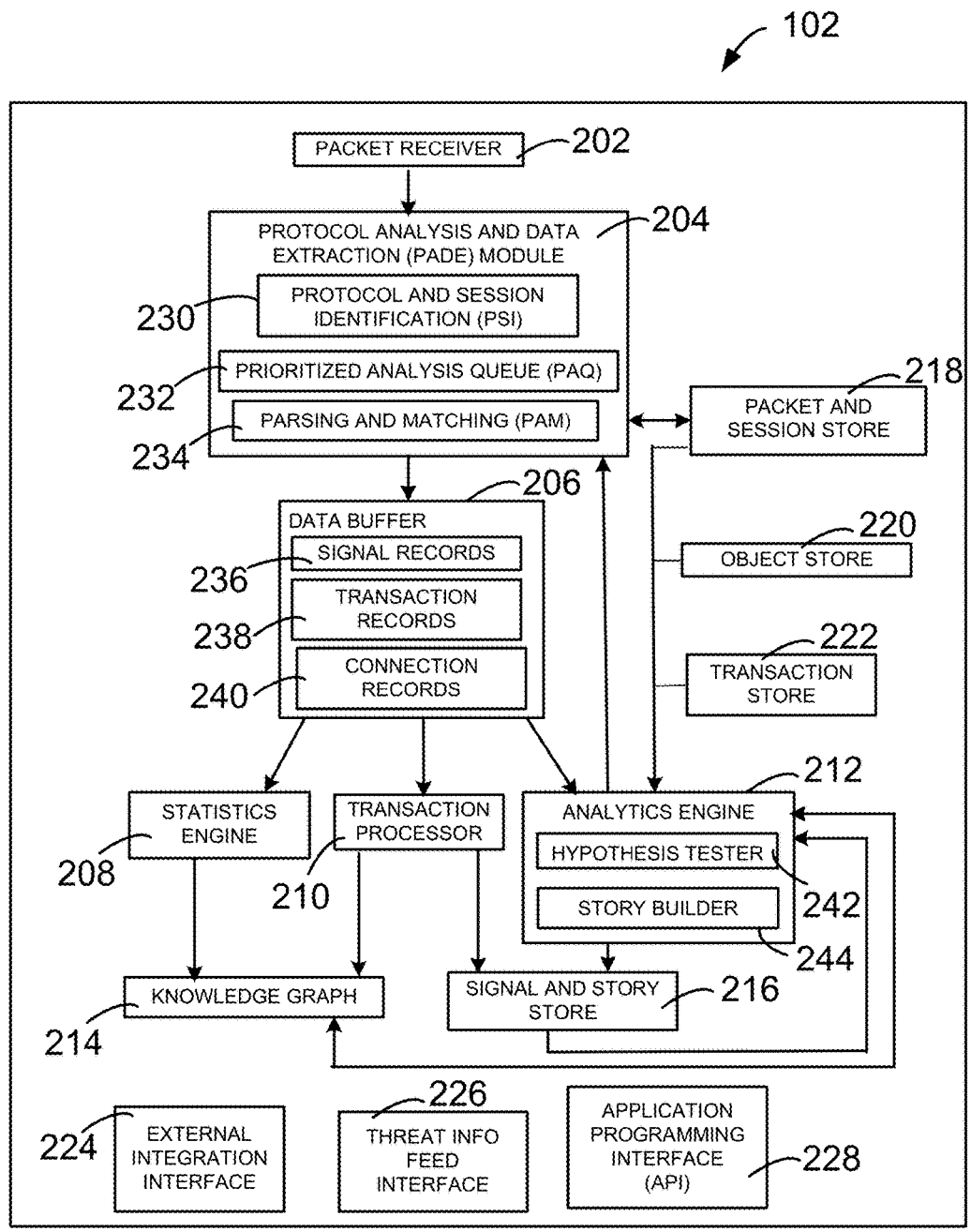
FIG. 2 depicts block diagram of an example security appliance of this disclosure.

Now, referring to FIG. 2, example security appliance 102 of this disclosure will be described. The security appliance 102 includes a packet receiver 202, a protocol analysis and data extraction module 204 (sometimes referred to as PADE module 204), a data buffer 206, a statistics engine 208, a transaction processor 210, an analytics engine 212, a knowledge graph 214, a signal and story store 216, a packet and session store 218, an object store 220 and a transaction store 222. The security appliance may additionally have an external integration interface 224, a threat info feed interface 226 and an application programming interface (API) 228. Various function and features of the security appliance 102 will now be described. Detailed operation of the security appliance 102 will be later described with reference to additional examples and figures.

The packet receiver 202 is configured to receive information from the network tap device 124. For example, packet receiver 202 may receive information related to network communication between a user computer and one or more servers, from the network tap device 124 in real time. Information related to network information may be one or more packets of information transmitted and received by the user computer. In some examples, the packet receiver 202 may be configured to receive information related to network communication between a user computer and one or more servers that might have been captured by a capture device (not shown) and stored in a data store (not shown). The information related to network communication between a user computer and one or more servers may sometimes be referred to as packets or packet of information in this disclosure. As one skilled in the art appreciates, the packet of information may contain information encapsulated in multiple layers. Analysis and extraction of information from each layer may lead to information in subsequent layers.

The PADE module 204 includes a protocol and session identification module 230 (sometimes referred to as PSI module 230), prioritized analysis queue 232 (sometimes referred to as PAQ module 232) and parsing and matching module 234 (sometimes referred to as PAM module 234). The PADE module 204 is configured to receive packet of information. The PADE module 204 queues the received packet to be stored in the packet and session store 218. Further, the PADE module 204 queues the received packet with an initial priority for further analysis by the PAQ module 232. The PAM module 234 analyzes the received packet by parsing protocol information from the packet content for each protocol encapsulated in the packet, and matches that data with feature patterns of interest, for example, security or network visibility. Processing of the packets by the PADE module 204 is an iterative process, where one level of encapsulation is processed to determine and discover information in that protocol and the protocol of the next encapsulation.

In one example, the prioritization used for analysis of the packet is based on a probability that the packet may be associated with a threat. This prioritization may be periodically updated, as the analysis of the packet proceeds. In some situations, there may be insufficient resources available at the packet and session store 218 to store all packets that are queued for storage. In one example, the selection of packet information to write (or store) to the packet and session store 218 may be based on a value of threat probability. In some examples, the selection of packet information to store may be based on a value of threat probability at the time selection is made, rather than when the packet was queued for storage. In other words, the queue to store the packet information is prioritized based on a value of threat probability.

Once a packet has been selected for storage, raw data of the packet may be written into the packet and session store 218 in a compressed form. The packet and session store 218 may also have indexing data for the packets to facilitate retrieval of the packets based on one or more attributes. For example, the attributes for indexing may be one or more of packet timestamp, network addresses, protocol and the like. Connection information extracted and generated by the PADE module 204 from one or more packets may contain references to corresponding sessions in the packet and session store 218. In one example, connection information may be stored in the knowledge graph 214, after further processing. Connection information may correspond to a plurality of attributes like user computer, details about user of the user computer, host server, organization of the user of the user computer and the like.

The PADE module 204 based on the analysis of the packets, identifies signal records, which may sometimes be referred to as weak signals indicative of a threat, transaction records and connection records. The identified signal records 236, transaction records 238 and the connection records 240 are stored in the data buffer 206 for further processing.

The statistics engine 208 processes the connection records 240 stored in the data buffer 206 and profiles the connection information from the connection records. Connection information may be stored in the knowledge graph 214, after further processing by the statistics engine 208. Connection information may correspond to a plurality of attributes like user computer, details about user of the user computer, host server, organization of the user of the user computer and the like.

The transaction processor 210 processes the transaction records 238 and extracts transaction information from the transaction records. Extracted transaction information by the transaction processor 210 is stored in the knowledge graph 214. Selective extracted transaction information is also stored in the signal and story store 216.

The analytics engine 212 processes the signal records 236. As previously indicated, signal records 236 may indicate weak signals of an impending threat. The analytics engine 212 analyzes the signal records 236 and develops a possible story of a likely threat. The story may be a sequence of signals about user computer, activity being performed and the like. The hypothesis tester 242 evaluates one or more weak signals for a likely threat. For example, one or more threshold values may be used to evaluate a likely threat. The story builder 244 builds a possible scenario for a likely threat, based on analyzed signal records. Selective generated story and corresponding signal records may be stored in the signal and story store 216.

As one skilled in the art appreciates, the information previously stored in the signal and story store 216 may be used by the analytics engine 212 during evaluation of subsequent signal records to further update or modify a possible scenario for a likely threat. Additionally, the analytics engine 212 may use information stored in the knowledge graph 214 during evaluation of signal records and building of a story for a likely threat. The story builder 244 also uses the analyzed signal records to generate information to update priority of analysis of incoming packets by the PADE module 204.

As one skilled in the art appreciates, the data buffer 206 may store information related to signal records 236, transaction records 238 and connection records 240 on a temporary basis. One or more additional data stores may be provided to store these information for an extended period of time, for possible future use. Object store 220 is a data store to store information related to various objects. For example, in some examples, objects may be files exchanged between a user computer and destination computer. Transaction store 222 stores information related to transaction, for example, for an extended period of time.

External integration interface 224 may provide an interface to communicate with other appliances, for example, other security appliances. Threat info feed interface 226 may provide an interface to communicate with external threat information feeds. These external threat information feed may be used by the security appliance 102 during various stages on analysis and story building. Application programming interface 228 may provide interface to one or more applications. For example, application programming interface 228 may provide an interface to an user interface application to permit a user to interact with the security appliance 102.

Figure 3:
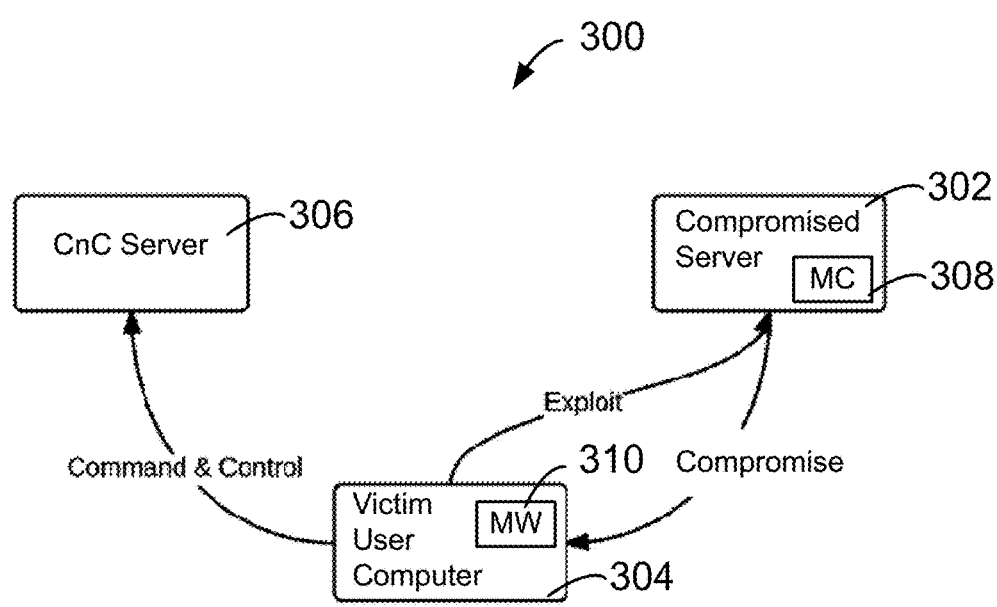
FIG. 3 shows various phases of an example malicious attack in an example computing environment.

Having described an example security appliance 102 of this disclosure, now referring to FIG. 3, flow diagram 300 shows various phases of an example malicious attack. FIG. 3 shows a compromised server 302, a victim user computer 304 and a command and control server 306 (sometimes referred to as a CnC server 306). In some examples, the victim user computer 304 may correspond to one of the first user computer 104-1, second user computer 104-2 and third user computer 104-3 described with reference to FIG. 1. In some examples, the compromised server 302 may correspond to first server 116 described with reference to FIG. 1. In some examples, the CnC server 306 may correspond to one or more of the second server 118, third server 120 and fourth server 122 described with reference to FIG. 1.

In general, a hacker compromises an external website running on a server the victim user computer 304 visits regularly, and injects malicious content 308 (sometimes referred to as malicious code 308) into the website. For example, the malicious content 308 may be present on the compromised server 302. When a user from the victim user computer 304 visits the website on the compromised server 302, the malicious code 308 may be executed. In some examples, the malicious code 308 may be an executable JavaScript. This phase may sometimes referred to as an exploit phase. In some examples, the malicious code 308 may load a malware 310 on to the victim user computer 304.

The malware 310 loaded on to the victim user computer 304 may be an executable code. This phase may sometimes be referred to as a compromise phase. The malware executable code may then connect to the CnC server 306 and waits for commands from the CnC server 306 to be executed on the victim user computer 304. This phase may sometimes referred to as command and control phase.

According to an example of this disclosure, one or more weak signals of a possible threat may be detected by the security appliance 102, in each of the exploit phase, compromise phase and command and control phase. For example, in the exploit phase, the malicious code 308 typically contain long lines of codes. For example, malicious code 308 may contain about 1000 characters or more. On the other hand, a legitimate JavaScript code may contain short lines of codes. For example, about 80 characters. In other words, in an example implementation, a threshold length of code may be defined and if a suspect code is greater than the threshold length of code, it may indicate a likely weak signal of a threat. As an example, if an anticipated average code length is about 80 characters, a threshold length of code may be set as a multiple of the anticipated average length of code, for example, two to ten times the anticipated average length of code. As one skilled in the art appreciates, the length of malicious code 308 may be detected or measured when the malicious code 308 is downloaded into the victim user computer 304 for execution. In some examples, the length of malicious code 308 may be measured by the security appliance 102, by intercepting the communication between the compromised server 302 and victim user computer 304.

In some examples, the malicious code may modify the entire document content. For example, the JavaScript code may modify the entire document using document.write function. In other words, in an example implementation, a function executed by a likely malicious code is determined and based on the function executed by the likely malicious code, a likely weak signal of a threat may be generated or triggered. As an example, the malicious code 308 is evaluated for type of function being performed. In some examples, the malicious code 308 is evaluated for the type of function being performed, in the security appliance 102, by intercepting the communication between the compromised server 302 and victim user computer 304.

In the compromise phase, the malware 310 typically is a small executable file. Generally, malware file sizes are in the range of about 100 kilobytes to 300 kilobytes. On the other hand, a legitimate installation file will be typically larger, for example, in the range of at least about 1 MB or greater. In other words, in an example implementation, a threshold value for a file size of the likely malware may be defined and if a suspect malware is less than or equal to the threshold file size, it may indicate a likely weak signal of a threat. As an example, if an average malware size may be set and a multiple of the average malware size may be set as a threshold value. For example, a multiple of one to three may be set as a threshold value. If for example, average malware size is set at 200 kilobytes, a multiple of three is used, threshold value of the file size will be 600 kilobytes. If an executable file of less than equal to 600 kilobytes is downloaded, the executable file may be a malware, indicating a likely weak signal. In some examples, the malware 310 may be encrypted or obfuscated. In other words, in an example implementation, an encrypted or obfuscated file may indicate a likely weak signal of a threat.

In the command and control phase, the malware 310 may send one or more HTTP POST requests with small random looking content to the CnC server 306. In response, the CnC server 306 may send empty responses to these HTTP POST requests. In some examples, the posted content may be different, but of same size. In other words, in an example implementation, communication between a victim user computer and a server is evaluated for the type of communication and content exchanged between the victim user computer and the server for a pattern. If the communication matches the pattern, it may indicate a likely weak signal of a threat.

Having described various phases of likely malicious attack and identification of likely weak signals of threat by the security appliance 102, now, referring to FIG. 4, an example table 400 is shown, which shows various network communication occurring between various computing devices. For example, the security appliance 102 may intercept the communication between various computing devices.

Now, referring to FIGS. 4A-4G, table 400 shows various network communication occurring between different computing devices. For example, the computing devices may be various computing devices shown in the network environment 100 of FIG. 1. The network communication may have a plurality of sessions. Sessions may be network sessions consisting of information transferred over a single communication channel (for example, a TCP connection or a UDP connection) between communication software on different computing devices. Generally, sessions consist of data sent back and forth between two computing devices. In some examples, more than two computing devices may participate, for example, in a broadcast session or a multicast session.

Column 402 shows time, column 404 shows Source IP address of a computing device, column 406 shows Destination IP address of a computing device and column 408 shows events occurring during a given time.

Now, referring to FIG. 4A rows 410-420 for a time range of T11-T12, various activities performed as part of session S1 will now be described. Referring to row 410, at time T11, DHCP session S1 is started. Referring to row 412, in session S1, IP address is requested. For example, request for IP address is sent to a DHCP server (not shown in FIG. 1). Referring to row 414, a reply is received from the DHCP server. For example, the DHCP server IP address is 2.2.2.2 and assigned IP address is 1.1.1.1. In this example, the IP address 1.1.1.1 is assigned to first user computer 104-1 of FIG. 1. Referring to row 418, the session S1 is ended.

As the security appliance 102 evaluates various network communication between computing devices, selective information is extracted from the network communication and stored in one or more tables in a data store. For example, these tables may be stored in knowledge graph 214 or signal and story store 216 of the security appliance 102, as shown in FIG. 2. An example knowledge graph table 500 is shown in FIG. 5 and an example connection record table 600 is shown in FIG. 6. Various entries in the knowledge graph table 500 and connection record table 600 are made based on the analysis of the network communication.

As an example, selective information derived from session S1, for example, as shown in row 416 may be stored in the knowledge graph table 500. As another example, selective information derived from session S1, for example, as shown in row 420 may be stored in the connection record table 600.

Now, referring to FIG. 5 and knowledge graph table 500, column 502 shows time, column 504 shows session, column 506 shows device IP, column 508 shows device entity, column 510 shows user entity and column 512 shows relationship. As an example, referring to row 514, at time T12, based on session S1, the device with IP address of 1.1.1.1 was first user computer and the relationship was "IP assigned". For example, selective information extracted from the network communication and populated in row 514 of the knowledge graph table 500 is shown in row 416 of the table 400 of FIG. 4A.

Now, referring to FIG. 6 and connection record table 600, column 602 shows time range, column 604 shows session, column 606 shows source IP, column 608 shows destination IP, column 610 shows protocol and column 612 shows meta data. As an example, referring to row 614, at time T11-12, based on session S1, the source IP address of 1.1.1.1 sent to destination IP address of 2.2.2.2 one packet of 100 bytes and received one packet of 500 bytes using DHCP protocol. For example, selective information extracted from the network communication and populated in row 614 of the connection record table 600 is shown in row 420 of the table 400 of FIG. 4.

Now, referring back to FIG. 4A, entries between rows 422 and 424 correspond to session S2. Based on the entries between rows 422 and 424, selective information from the network communication is extracted. For example, extracted selective information is populated in the knowledge graph table 500 at row 516 of FIG. 5. As an example, referring to row 516, at time T50, based on session S2, the device with IP address of 1.1.1.2 was second user computer and the relationship was "IP assigned". For example, selective information extracted from the network communication and populated in row 516 of the knowledge graph table 500 is shown in row 426 of the table 400 of FIG. 4A.

Now, referring to row 616 of connection record table 600 of FIG. 6, selective information for session S2 is entered in the connection table 600. As an example, referring to row 616, at time T49-50, based on session S2, the source IP address of 1.1.1.2 sent to destination IP address of 2.2.2.2 one packet of 100 bytes and received one packet of 500 bytes using DHCP protocol. For example, selective information extracted from the network communication and populated in row 616 of the connection record table 600 is shown in row 424 of the table 400 of FIG. 4A.

Now, referring to FIG. 4B, entries between rows 428 and 430 of table 400 correspond to sessions S3 and S4. Based on the entries between rows 428 and 430, selective information from the network communication is extracted. For example, extracted selective information is populated in the knowledge graph table 500 at row 518 of FIG. 5. As an example, referring to row 518, at time T51, based on session S3, the device with IP address of 1.1.1.2 was second user computer and the relationship was "system booted". For example, selective information extracted from the network communication and populated in row 518 of the knowledge graph table 500 is shown in row 432 of the table 400 of FIG. 4B. In this example, the security appliance 102 is able to conclude that the second user computer booted in session S3, based on the HTTP request GET/update issued by a specific application and corresponding response.

In this example, the security appliance 102 is concluding an event occurred or not occurred (for example, Event A) based on another event (for example, Event B) occurred or not occurred. For these types of inferences or conclusions, Event B may sometimes be referred to as a consequential artifact. In other words, HTTP request GET/update issued by a specific application and corresponding response corresponds to Event B and an conclusion that the second user computer booted in session S3 corresponds to Event A. In some examples, the security appliance 102 may conclude an event occurred based on the event itself. In other words, if a file was downloaded in session S3, that event of downloading a file may be referred to as a direct artifact.

Now, referring to row 618 of connection record table 600 of FIG. 6, selective information for session S3 is entered in the connection table 600. As an example, referring to row 618, at time T50-51, based on session S3, the source IP address of 1.1.1.2 sent to destination IP address of 103.4.4.4 five packets with a total of 200 bytes and received four packets with a total of 150 bytes using HTTP protocol. For example, selective information extracted from the network communication and populated in row 618 of the connection record table 600 is shown in row 430 of the table 400 of FIG. 4B.

Now, referring to FIG. 4B, row 434, during session S4, an unknown protocol session was initiated. This information is stored in an indicator table 700, shown in FIG. 7. Now, referring to FIG. 7, indicator table 700, column 702 shows time, column 704 shows session, column 706 shows source IP, column 708 shows destination IP, column 710 shows indicator. In some examples, the indicator 710 may correspond to a weak signal. Referring to row 712, at time T51, during session S4, computing device with IP address of 1.1.1.2 communicated with computing device with IP address of 200.1.1.1 using an unknown protocol. For example, selective information extracted from the network communication and populated in row 712 of the indicator table 700 is shown in row 436 of the table 400 of FIG. 4B.

Further, referring to row 714 of indicator table 700, another indicator "on system boot" is recorded for session S4 at time T51. As one skilled in the art appreciates, this entry was based on an analysis of session S3, where it was concluded that second user computer booted at time T51, as shown in row 514 of knowledge graph 500. As one skilled in the art appreciates, the indicators shown in rows 712 and 714 may indicate a possible command and control phase communication between second user computer and a malicious server, for example, a CnC server with an IP address of 200.1.1.1.

Now, referring to row 620 of connection record table 600 of FIG. 6, selective information for session S4 is entered in the connection table 600. As an example, referring to row 620, at time T50-51, based on session S4, the source IP address of 1.1.1.2 sent to destination IP address of 200.1.1.1 one packet of 70 bytes and received one packet of 50 bytes using an unknown protocol. For example, selective information extracted from the network communication and populated in row 620 of the connection record table 600 is shown in row 438 of the table 400 of FIG. 4B.

Now, referring to FIG. 4C, entries between rows 440 and 442 of table 400 correspond to session S5. Based on the entries between rows 440 and 442, selective information from the network communication is extracted. For example, extracted selective information corresponding to row 442 is populated in the connection record table 600 at row 622 of FIG. 6. Additionally, referring to row 444 of FIG. 4, the file from obscuresite.com is added to the object store associated with the first user computer, for example, in object store 220 of the security appliance 102. In this example, downloading of the file from obscuresite.com is a direct artifact.

Entries between rows 446 and 448 correspond to session S6. Based on the entries between rows 446 and 448, selective information from the network communication is extracted. In this example, in session S6, the first user computer has moved to a new location and connected to network interconnect 108 of FIG. 1. When the first user computer tries to renew its IP address of 1.1.1.1, the DHCP server rejects the IP address, due to its new location and assigns a new IP address, in this case, an IP address of 3.3.3.3. For example, extracted selective information corresponding to row 450 is populated in the knowledge graph table 500 at row 520 of FIG. 5. And, extracted selective information corresponding to row 448 is populated in the connection record table 600 at row 624 of FIG. 6.

Now, referring to FIG. 4D, entries between rows 452 and 454 of table 400 correspond to session S7. Based on the entries between rows 452 and 454, selective information from the network communication is extracted. In this example, in session S7, the first user computer sends a request to get an image from www.google.com and receives the image file in response. Referring to row 456, the image file received from www.google.com is stored in the object store associated with first user computer, for example, in object store 220 of the security appliance 102. For example, extracted selective information corresponding to row 454 is populated in the connection record table 600 at row 626 of FIG. 6. As the security appliance 102 concluded that there was no information of interest in session S7 to be recorded in the knowledge graph table 500, there is no corresponding entry in the knowledge graph table 500 for session S7.

Now, referring to FIG. 4E, entries between rows 458 and 460 correspond to start of an instant messaging (IM) session S8. Based on the entries between rows 458 and 460, selective information from the network communication is extracted. In this example, in session S8, the first user using the first user computer sends an IM registration request and receives an acknowledgement. For example, extracted selective information corresponding to row 460 is populated in the knowledge graph table 500 at row 522 of FIG. 5. In this example, relationship between a device entity, in this case, first user computer and a user entity, the first user is established and maintained in the knowledge graph.

Referring back to FIG. 4E, entries between rows 462 and 464 correspond to session S9. Based on the entries between rows 462 and 464, selective information from the network communication is extracted. For example, extracted selective information corresponding to row 466 is populated in the knowledge graph table 500 at row 524 of FIG. 5. And, extracted selective information corresponding to row 464 is populated in the connection record table 600 at row 628 of FIG. 6.

Now, referring to FIG. 4F, entries between rows 468 and 470 of table 400 correspond to sessions S10 and S11. Based on the entries between rows 468 and 470, selective information from the network communication is extracted. For example, extracted selective information corresponding to row 472 is populated in the indicator table 700 at row 716 of FIG. 7. Extracted selective information corresponding to row 474 is populated in the knowledge graph table 500 at row 526 of FIG. 5. Extracted selective information corresponding to row 476 is populated in the indicator table 700 at row 718 of FIG. 7. Extracted selective information corresponding to row 478 is populated in the connection record table 600 at row 630 of FIG. 6. And, extracted selective information corresponding to row 470 is populated in the connection record table 600 at row 632 of FIG. 6.

Now, referring to FIG. 4G, entries between rows 480 and 482 of table 400 correspond to start of an instant messaging (IM) session S12. Based on the entries between rows 480 and 482, selective information from the network communication is extracted. In this example, in session S12, the second user using the second user computer sends an IM registration request and receives an acknowledgement. For example, extracted selective information corresponding to row 482 is populated in the knowledge graph table 500 at row 528 of FIG. 5.

Now, referring back to FIG. 4G, entries between rows 484 and 486 correspond to instant messages between first user and the second user. The first user is using the instant messaging session started in session S8 and the second user is using the instant messaging session started in session S12. In this example, the IM server has an IP address of 2.2.2.30. Now, referring to row 488, an instant message is sent to first user, with a hyperlink, through the IM server. For example, the source IP address of 1.1.1.2 sends the instant message to the IM server with an IP address of 2.2.2.30, using session S12 which is registered to second user. Referring to row 486, the instant message received from the second user is now sent to the first user, using session S8, along with the hyperlink. In this example, the hyperlink may be to a malicious host.

Entries between rows 490 to 492 correspond to session S13. In this session, the first user computer (based on source IP address of 3.3.3.3) starts an HTTP session with a host with IP address of 201.2.2.2. In one example, the host with IP address of 201.2.2.2 may be a malicious host, which may be accessed when the hyperlink from the instant message is activated. In one example, this activity may correspond to an exploit phase described with reference to FIG. 3.

In response, the first user computer receives a file. In one example, this activity may correspond to a compromise phase described with reference to FIG. 3. Now, referring to FIG. 4G, row 494, the received file is added to an object store associated with first user computer, for example, in object store 220 of the security appliance 102. Referring to row 496, extracted selective information corresponding to row 498 is populated in the indicator table 700 at row 720 of FIG. 7. Extracted selective information corresponding to row 498 is populated in the connection record table 600 at row 634 of FIG. 6.

Now, the security appliance waits for the execution of the exploit code downloaded to the first user computer. In one example, prior to execution of the exploit code, the first user computer performs a certificate revocation check. In one example, the certificate revocation check is performed within a known time unit, for example, two time unit after the download of the executable. As the exploit code was downloaded at time T113, no new session was initiated by the first user computer to perform certificate revocation check by time T115. So, based on this analysis, the security appliance concludes that the exploit code was not executed by the first user computer.

As previously discussed, this is an example of a consequential artifact, where an event (certification revocation check) did not occur and based on the event not occurring, a conclusion is reached that the execution of exploit code did not occur (again another example of an event not occurring). In other words, in this example, the event A did not occur (certificate revocation check) and so, it is inferred that event B did not occur (execution of the malicious code). Referring to FIG. 4G, row 492, extracted selective information corresponding to row 492 is populated in the indicator table 700 at row 722 of FIG. 7.

In one example, the security appliance 102 may trigger a message to a user to indicate that an exploit code has been loaded on to first user computer by first user which has not been executed. The user may then take actions to minimize threat posed by the exploit code. For example, the user may selectively delete the exploit code. As the exploit code is stored in the object store, one or more signatures for the exploit code may be generated. The generated signature may be advantageously used to prevent future malicious activity.

In some examples, it may be beneficial to analyze and selectively present various information exchanged between computing devices based upon an activity. For example, multiple packets of information may be exchanged between computing devices, based upon one or more protocols the packets conform to. In a given time frame, numerous packets are exchanged between computing devices, sometimes, in excess of thousands of packets, within a short period of time. Reviewing one of the packets and selectively finding another packet which may be associated with that earlier packet is an extremely difficult task for a user to perform manually. Moreover, depending upon the protocol followed by the packets of information different portions of the packet data may have to be identified and correlated with a subsequent packet of information.

Now, referring to FIG. 8, an example packet of information 800 is shown. Packet of information 800 has a plurality of lines of information, each line of information is identified by a line number. As one skilled in the art appreciates, a raw packet of information with plurality of fields of data exchanged between two computing devices using a specific protocol may be decoded into individual fields of data, using a decoding program, sometimes referred to as a packet analyzer or network data analyzer. As an example, referring to row 802 which corresponds to line 01, packet of information 800 is labeled as Frame 1. And, referring to row 804 which corresponds to line 02, Arrival Time: Jan. 4, 2017 14:16:07.751848510 PST is shown.

Now, referring to FIGS. 9A and 9B, another example packet of information 900 is shown. Packet of information 900 has a plurality of lines of information, each line of information is identified by a line number. Referring to row 902 which corresponds to line 14, packet of information 900 is labeled as Frame 2. And, referring to row 904 which corresponds to line 15, Arrival Time: Jan. 4, 2017 14:16:07.771755233 PST is shown.

In this example, the packet of information 800 and packet of information 900 are related. Although the packet of information 800 is labeled as Frame 1 and packet of information 900 is labeled as Frame 2, as one skilled in the art appreciates, the arrival time for these two packet of information is not consecutive. In other words, there can be a significant time delay (from a computing time perspective) between the two packets of information. In one example, the packet of information 800 is selectively matched with packet of information 900 to identify the relationship between the two packets of information.

In this example, the packet of information 800 refers to a request and the packet of information 900 refers to a response. Using FIGS. 8, 9A and 9B, an example grouping of information contained in Frame 1 and Frame 2 to derive a summary activity report as shown in FIG. 10A is described. For example, the security appliance may be configured to perform the grouping and generate an example summary activity report as shown in FIG. 10A.

Now, referring to FIG. 10A, a summary activity report 1000 table is shown. The summary activity report 1000 in column 1002 shows the start time, column 1004 shows end time, column 1006 shows source computing device, column 1008 shows destination computing device, column 1010 shows the protocol and column 1012 shows the summary, for example, summary for the pair of packet of information 800 and 900.

Various selective grouping of portions of the packet of information to derive the summary activity report 1000 table is now described.

First, protocol information of Frame 1 is compared with the protocol information of Frame 2 for a match. For example, information contained in rows 806, 808 and 810 which corresponds to lines 03, 05 and 06 of packet of information 800 is compared with information contained in rows 906, 908 and 910 which corresponds to lines 16, 18 and 19 of packet of information 900 for a match. In this example, there is a match. In some examples, based on the identified protocol, selective grouping of other portions of the packet of information is performed. This example refers to protocol "Domain Name System", as shown in row 810, line 06. And, based on information contained in row 810, line 06 of Frame 1, Frame 1 corresponds to a request. And, based on information contained in row 910, line 19 of Frame 2, Frame 2 corresponds to a response.

Next, arrival time of Frame 1 is compared with arrival time of Frame 2, to be within a threshold value. For example, information contained in row 804, line 02 of packet of information 800 is compared with information contained in row 904, line 15 of packet of information 900, to be within a prescribed threshold value TV1. In this example, the arrival time of packet of information 900 is within the prescribed threshold value TV1. In some examples, the prescribed threshold value TV1 may be of the order of a few seconds to a few minutes. For a DNS queries, it may be of the order of a minute.

Next, source identification (Src) of Frame 1 is compared with destination identification (Dst) of Frame 2, for a match. For example, selective information corresponding to Src contained in row 806 which corresponds to line 03 of packet of information 800 is compared with selective information corresponding to Dst contained in row 906 which corresponds to line 16 of packet of information 900, for a match. In this example, the Src of Frame 1 is 192.168.40.72 is same as Dst of Frame 2 which is 192.168.40.72.

Next, destination identification (Dst) of Frame 1 is compared with source identification (Src) of Frame 2, for a match. For example, selective information corresponding to Dst contained in row 806 which corresponds to line 03 of packet of information 800 is compared with selective information corresponding to Src contained in row 906 which corresponds to line 16 of packet of information 900, for a match. In this example, the Dst of Frame 1 is 192.168.40.1 is same as Src of Frame 2 which is 192.168.40.1.

Next, protocol of Frame 1 is compared with protocol of Frame 2, for a match. For example, selective information corresponding to protocol contained in row 812 which corresponds to line 04 of packet of information 800 is compared with selective information corresponding to protocol contained in row 912 which corresponds to line 17 of packet of information 900, for a match. In this example, the protocol of Frame 1, UDP is same as protocol of Frame 2 which is also UDP.

Next, source port (Src Port) of Frame 1 is compared with destination port (Dst Port) of Frame 2, for a match. For example, selective information corresponding to Src Port contained in row 808 which corresponds to line 05 of packet of information 800 is compared with selective information corresponding to Dst Port contained in row 908 which corresponds to line 18 of packet of information 900, for a match. In this example, the Src Port of Frame 1 is 45558 is same as Dst Port of Frame 2 which is 45558.

Next, destination port (Dst Port) of Frame 1 is compared with source port (Src Port) of Frame 2, for a match. For example, selective information corresponding to Dst Port contained in row 808 which corresponds to line 05 of packet of information 800 is compared with selective information corresponding to Dst Port contained in row 908 which corresponds to line 18 of packet of information 900, for a match. In this example, the Dst Port of Frame 1 is 58 is same as Src Port of Frame 2 which is 58.

Next, domain name system transaction ID (Transaction ID) of Frame 1 is compared with domain name system transaction ID (Transaction ID) of Frame 2, for a match. For example, selective information corresponding to Transaction ID contained in row 814 which corresponds to line 07 of packet of information 800 is compared with selective information corresponding to Transaction ID contained in row 914 which corresponds to line 20 of packet of information 900, for a match. In this example, the Transaction ID of Frame 1 is 0x9bb1 is same as Transaction ID of Frame 2 which is 0x9bb1.

Next, domain name system question type (Type) of Frame 1 is compared with domain name system question type (Type) of Frame 2, for a match. For example, selective information corresponding to Type contained in row 816 which corresponds to line 12 of packet of information 800 is compared with selective information corresponding to Type contained in row 916 which corresponds to line 25 of packet of information 900, for a match. In this example, the Type for Frame 1 is "A" and is same as Type for Frame 2 which is also "A".

Finally, domain name system question name of Frame 1 is compared with domain name system question name of Frame 2, for a match. For example, selective information corresponding to domain name system question name contained in row 816 which corresponds to line 12 of packet of information 800 is compared with selective information corresponding to domain name system question name contained in row 916 which corresponds to line 25 of packet of information 900, for a match. In this example, the domain name system question name for Frame 1 is "www.pcmag.com" and is same as domain name system question name for Frame 2 which is also "www.pcmag.com".

Based on the match for various selective information between packet of information 800 and packet of information 900, various columns of activity report 1000 table shown in FIG. 10A is populated. For example, referring to row 1014 of FIG. 10A, we notice that Start time corresponds to the Arrival Time of Frame 1. End time corresponds to the Arrival Time of Frame 2. Source corresponds to the source identification of Frame 1, along with the source port number. Destination corresponds to the destination identification Frame 1, along with the destination port number.

In some example, source identification may further include a name assigned to computing device that corresponds to the source identification at that time. In this example, the name assigned to the computing device that corresponds to the source identification at that time was john/john-tablet.acme.net. In some example, destination identification may further include a name assigned to computing device that corresponds to the destination identification at that time. In this example, the name assigned to the computing device that corresponds to the destination identification at that time was router.acme.net.

Protocol column shows acronym IP for Internet Protocol V4 and acronym UDP for User Datagram Protocol, as determined by analyzing selective fields of information in Frame 1.

Finally, summary column 1012 shows a summary of the communication transaction between the source computing device and the destination computing device. Now, referring back to packet of information 900 shown in FIGS. 9A and 9B, (Frame 2), we notice that row 918 which corresponds to line 22 indicates that there was one question received and row 920 which corresponds to line 23 indicates that there were four answers. Further, referring to row 922, starting with line 27, information related to four answers are shown.

Now, referring back to row 1014 and column 1012 of activity report 1000 table, we notice the summary includes information related to the question and corresponding answers. For example, the question was a "DNS Query A for www.pcmag.com" (from rows 810 and 816 of information packet 800 as shown in FIG. 8). Now, referring to information packet 900 as shown in FIG. 9, the answers were CNAME a003.ziffdavis.inscname.net for 108 seconds (from rows 924 and 926 which corresponds to lines 32 and 33 of Frame 2); CNAME ins-062.inscname.net for 545 seconds (from rows 928 and 928 which corresponds to lines 38 and 39 of Frame 2); CNAME a-sg01s103.insnw.net for 2595 seconds (from rows 932 and 934 which corresponds to lines 44 and 45 of Frame 2). This is followed by A 192.33.31.70 for 2604 seconds (from row 936 which corresponds to information from line 48 (Type:A), row 938 which corresponds to line 51 (address: 192.33.31.70) and row 940 which corresponds to line 50 (time to live: 2604)).

In some examples, the packet of information 800 may be summarized in a row of the summary activity report, without a corresponding matching packet of information. For example, the security appliance may not find a matching packet of information that corresponds to packet of information 800, within a predefined threshold value of TV1. In yet another example, the security appliance may not find a matching packet of information that corresponds to packet of information 900, within a predefined threshold value of TV1.

Figure 10B:

Referring to FIG. 10B, another example summary activity report 1000A is shown. Summary activity report 1000A is similar to summary activity report 1000 shown in FIG. 10A. The summary activity report 1000A in column 1002 shows the start time, column 1004 shows end time, column 1006 shows source computing device, column 1008 shows destination computing device, column 1010 shows the protocol and column 1012 shows the summary.

Referring to row 1020, summary activity report for packet of information 800 is shown, when there is no corresponding matching packet of information. Referring to row 1022, summary activity report for packet of information 900 is shown, when there is no corresponding matching packet of information.

Based on various selective information extracted from packet of information 800, various columns of activity report 1000A table shown in FIG. 10B is populated as shown in row 1020. For example, referring to row 1020 of FIG. 10A, we notice that Start time corresponds to the Arrival Time of Frame 1. End time also corresponds to the Arrival Time of Frame 1. Source corresponds to the source identification of Frame 1, along with the source port number. Destination corresponds to the destination identification Frame 1, along with the destination port number.

In some example, source identification may further include a name assigned to computing device that corresponds to the source identification at that time. In this example, the name assigned to the computing device that corresponds to the source identification at that time was john/john-tablet.acme.net. In some example, destination identification may further include a name assigned to computing device that corresponds to the destination identification at that time. In this example, the name assigned to the computing device that corresponds to the destination identification at that time was router.acme.net.

Protocol column 1010 shows acronym IP for Internet Protocol V4 and acronym UDP for User Datagram Protocol, as determined by analyzing selective fields of information in Frame 1. For example, as previously discussed, analysis of rows 806 and 812 of information packet 800 shown in FIG. 8 yields the protocol information.

Now, referring to row 1020 and column 1012 of activity report 1000A table, we notice the summary includes information related to the question. For example, the question was a "DNS Query A for www.pcmag.com" (from rows 810 and 816 of information packet 800 as shown in FIG. 8). However, in this example, there was no matching information packet. Therefore, the summary further includes a notation "<-no response observed".

Now, referring to row 1022, summary activity report for packet of information 900 is shown, when there is no corresponding matching packet of information. Referring to row 1022, summary activity report for packet of information 900 is shown, when there is no corresponding matching packet of information.

Based on various selective information extracted from packet of information 900 (as shown in FIGS. 9A and 9B), various columns of activity report 1000A table shown in FIG. 10B is populated as shown in row 1022. For example, referring to row 1022 of FIG. 10A, we notice that Start time corresponds to the Arrival Time of Frame 2. End time also corresponds to the Arrival Time of Frame 2. Source corresponds to the destination identification of Frame 2, along with the destination port number. Destination corresponds to the source identification Frame 2, along with the source port number. As one skilled in the art appreciates, as the information packet 900 is a response (as identified in row 910 of FIG. 9A), the source and destination information are swapped in the summary activity report 1000A.

In some example, source identification may further include a name assigned to computing device that corresponds to the source identification at that time. In this example, the name assigned to the computing device that corresponds to the source identification at that time was john/john-tablet.acme.net. In some example, destination identification may further include a name assigned to computing device that corresponds to the destination identification at that time. In this example, the name assigned to the computing device that corresponds to the destination identification at that time was router.acme.net.

Protocol column 1010 shows acronym IP for Internet Protocol V4 and acronym UDP for User Datagram Protocol, as determined by analyzing selective fields of information in Frame 2. For example, as previously discussed, analysis of rows 906 and 912 of information packet 900 shown in FIG. 9A yields the protocol information.

Now, referring to row 1022 and column 1012 of activity report 1000A table, we notice the summary includes a notation that "No request was observed", as there was no matching request observed. Further, the summary includes information related to the answers, as extracted from the information packet 900, as previously described with reference to summary activity report 1000, row 1014 and column 1012.

As one skilled in the art appreciates, the security appliance may be configured to generate the summary activity report, as various packets of information are processed in real time or near real time. For example, initially, the summary activity report may include selective information as shown in row 1020 of summary activity report 1000A of FIG. 10B, as information packet 800 is processed. And, the security appliance may await for a corresponding matching response, for example, as shown in information packet 900, for a predefined threshold time TV1. When a corresponding matching response is received within the predefined threshold time TV1, then, the end time 1004 and summary 1012 columns may be selectively updated, with information as shown in row 1014 of summary activity report 1000 of FIG. 10A.

In the previous example, the grouping of information and summary information in the summary activity report was based on a DNS query and a corresponding response, for example, based on the protocol IP UDP DNS. The grouping of information and summary information in the summary activity report may change if the information packet is based on a different protocol. Another example grouping of information and summary information will now be described with reference to a different protocol known as Internet Control Message Protocol (commonly referred to as ICMP protocol). One usage of the ICMP protocol is to test connectivity on the network using sequence of messages called Echo Request and Echo Reply messages. These are usually generated by a program with the name "ping" and referred to as "pings". In some examples, there may be over 5000 protocol messages sent over approximately 30 seconds.

There are two types of protocol messages in use in this exchange, where the first, an ICMP Echo (ping) request, is paired with the second, an ICMP Echo (ping) reply. Unlike the Domain Name Service name look up exchange previously described with reference to FIGS. 8, 9A, 9B, 10A and 10B, in a ping exchange, the individual request and response messages are not particularly significant, as multiple request-response pairs are sent as part of the same exchange. In this example, it may be useful to provide a summary of multiple request-response pairs. Another example summary activity report table will now be described, using an example ICMP Echo (ping) request information packet and a corresponding ICMP Echo (ping) response packet.

Referring to FIGS. 11A and 11B, an example packet of information 1100 that corresponds to an ICMP Echo (ping) request message is shown. Referring to FIGS. 12A and 12B, an example packet of information 1200 that corresponds to an ICMP Echo (ping) response message is shown. And, referring to FIG. 13A, another example summary activity report 1000B table is shown. Selection of various selective information from packet of information 1100 and 1200 to construct example summary activity report 1000B table will now be described.

Now, referring to FIGS. 11A and 11B, an example packet of information 1100 is shown. Packet of information 1100 has a plurality of lines of information, each line of information is identified by a line number. As one skilled in the art appreciates, a raw packet of information with plurality of fields of data exchanged between two computing devices using a specific protocol may be decoded into individual fields of data, using a decoding program, sometimes referred to as a packet analyzer or network data analyzer. As an example, referring to row 1102 which corresponds to line 01, packet of information 1102 is labeled as Frame 1. And, referring to row 1104 which corresponds to line 02, Arrival Time: May 12, 2017 11:38:05.972792000 PDT is shown.

Now, referring to FIGS. 12A and 12B, another example packet of information 1200 is shown. Packet of information 1200 has a plurality of lines of information, each line of information is identified by a line number. Referring to row 1202 which corresponds to line 60, packet of information 1202 is labeled as Frame 2. And, referring to row 1204 which corresponds to line 61, Arrival Time: May 12, 2017 11:38:05.975449000 PDT is shown.

In this example, the packet of information 1100 and packet of information 1200 are related. Although the packet of information 1100 is labeled as Frame 1 and packet of information 1200 is labeled as Frame 2, as one skilled in the art appreciates, the arrival time for these two packet of information is not consecutive. In other words, there can be a significant time delay (from a computing time perspective) between the two packets of information. In one example, the packet of information 1100 is selectively matched with packet of information 1200 to identify the relationship between the two packets of information.

Figure 13A:
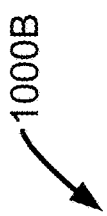
FIGS. 13A and 13B show another example activity record table generated by the security appliance.

In this example, the packet of information 1100 refers to a Ping request and the packet of information 1200 refers to a Ping response. Using FIGS. 11A, 11B, 12A and 12B, an example grouping of information contained in Frame 1 and Frame 2 to derive a summary activity report as shown in FIG. 13A is described. For example, the security appliance may be configured to perform the grouping and generate an example summary activity report as shown in FIG. 13A.

Now, referring to FIG. 13A, a summary activity report 1000B table is shown. The summary activity report 1000B in column 1002 shows the start time, column 1004 shows end time, column 1006 shows source computing device, column 1008 shows destination computing device, column 1010 shows the protocol and column 1012 shows the summary.

Various selective grouping of portions of the packet of information to derive the summary activity report 1000B table is now described.

First, protocol information of Frame 1 is compared with the protocol information of Frame 2 for a match. For example, information contained in rows 1106 and 1108 which corresponds to lines 003 and 005 of packet of information 1100 is compared with information contained in rows 1206 and 1208 which corresponds to lines 062 and 064 of packet of information 1200 for a match. In this example, there is a match. In some examples, based on the identified protocol, selective grouping of other portions of the packet of information is performed. This example refers to protocol "Internet Control Message Protocol", as shown in row 1108, line 005. And, based on information contained in row 1110, line 06 of Frame 1, Frame 1 corresponds to Type 8, which is an Echo (ping) request. And, based on information contained in row 1210, line 065 of Frame 2, Frame 2 corresponds to Type 0, which is an Echo (ping) reply.

Next, arrival time of Frame 1 is compared with arrival time of Frame 2, to be within a threshold value. For example, information contained in row 1104, line 002 of packet of information 1100 is compared with information contained in row 1204, line 061 of packet of information 1200, to be within a prescribed threshold value TV2. In this example, the arrival time of packet of information 1100 is within the prescribed threshold value TV2. In some examples, the prescribed threshold value TV2 may be of the order of 10 seconds.

Next, source identification (Src) of Frame 1 is compared with destination identification (Dst) of Frame 2, for a match. For example, selective information corresponding to Src contained in row 1106 which corresponds to line 003 of packet of information 1100 is compared with selective information corresponding to Dst contained in row 1206 which corresponds to line 062 of packet of information 1200, for a match. In this example, the Src of Frame 1 is 192.168.40.72 is same as Dst of Frame 2 which is 192.168.40.72.

Next, destination identification (Dst) of Frame 1 is compared with source identification (Src) of Frame 2, for a match. For example, selective information corresponding to Dst contained in row 1106 which corresponds to line 003 of packet of information 1100 is compared with selective information corresponding to Src contained in row 1206 which corresponds to line 062 of packet of information 1200, for a match. In this example, the Dst of Frame 1 is 192.168.40.72 is same as Src of Frame 2 which is 192.168.40.72.

Next, protocol of Frame 1 is compared with protocol of Frame 2, for a match. For example, selective information corresponding to protocol contained in row 1112 which corresponds to line 004 of packet of information 1100 is compared with selective information corresponding to protocol contained in row 1212 which corresponds to line 063 of packet of information 1200, for a match. In this example, the protocol of Frame 1, ICMP(1) is same as protocol of Frame 2 which is also ICMP(1).

Next, Internet Control Message Protocol Type (Type) of Frame 1 is compared with Internet Control Message Protocol Type (Type) of Frame 2, for a match. For example, selective information corresponding to Type contained in row 1110 which corresponds to line 006 of packet of information 1100 is compared with selective information corresponding to Type contained in row 1210 which corresponds to line 065 of packet of information 1200, for either a 0 (Echo (ping) reply) or 8 (Echo (ping) request). In this example, the Type of Frame 1 is 8 (Echo (ping) request) and Type of Frame 2 is 0 (Echo (ping) reply). In this example, the match is a complementary Type, for example, a request-reply pair.

Next, Internet Control Message Protocol Code (Code) of Frame 1 is compared with Internet Control Message Protocol Code (Code) of Frame 2, for a match. For example, selective information corresponding to Code contained in row 1114 which corresponds to line 007 of packet of information 1100 is compared with selective information corresponding to Code contained in row 1214 which corresponds to line 066 of packet of information 1200, for a match. In this example, the Code of Frame 1 is 0 and Code of Frame 2 is also 0.

Finally, Internet Control Message Protocol Identifier (Identifier) of Frame 1 is compared with Internet Control Message Protocol Identifier (Identifier) of Frame 2, for a match. For example, selective information corresponding to Identifier contained in row 1116 which corresponds to line 008 of packet of information 1100 is compared with selective information corresponding to Identifier contained in row 1216 which corresponds to line 067 of packet of information 1200, for a match. In this example, the Identifier of Frame 1 is 9643 and Identifier of Frame 2 is also 9643.

Furthermore, within this grouping, subgroupings are made for each echo request and echo reply pair, using the sequence number. For example, Internet Control Message Protocol Sequence number (Sequence number) of Frame 1 is compared with Internet Control Message Protocol Sequence number (Sequence number) of Frame 2, for a match. For example, selective information corresponding to Sequence number contained in row 1118 which corresponds to line 009 of packet of information 1100 is compared with selective information corresponding to Sequence number contained in row 1218 which corresponds to line 068 of packet of information 1200, a match. In this example, the Sequence number of Frame 1 is 1 and Sequence number of Frame 2 is also 1.

The packet of information 1100 and packet of information 1200 both have data that is transmitted as a payload. For example, referring to packet of information 1100, row 1120, payload of 753 bytes of data was included in the message. The payload data is contained in lines 011-058. And, referring to packet of information 1200, row 1220, payload of 753 bytes of data was included in the message. The payload data is contained in lines 070-117. Further, in this example, the bytes of data in the payload of packet of information 1100 is different than the bytes of data in the payload of packet of information 1200. So, the bytes of data in the payload is considered to have two unique payloads, in the pair of packet of information 1100 and packet of information 1200. As one skilled in the art appreciates, the security appliance may be configured to generate a hash of the payload of data for Frame 1 and Frame 2 and compare for a match. If there is a match, then, there is only one unique payload of data. If there is no match, then there are two unique payloads of data.

In this example, a total of 5622 protocol messages were sent over approximately 30 seconds. Frame 1 and Frame 2 described above are just two of the 5622 protocol messages exchanged. Based on the match for various selective information between packet of information 1100 and packet of information 1200, various columns of activity report 1000B table shown in FIG. 13A is populated. In this example, last of the protocol message that was similar to Frame 2, was received at May 12, 2017, 11:38:37.4503080000PDT. This packet of information was received about 30 seconds from the time packet of information 1100 was sent.

For example, referring to row 1030 of FIG. 13A, we notice that Start time corresponds to the Arrival Time of Frame 1. End time corresponds to the Arrival Time of last of the frame that was similar to Frame 2. Source corresponds to the source identification of Frame 1. Destination corresponds to the destination identification Frame 1.

In some example, source identification may further include a name assigned to computing device that corresponds to the source identification at that time. In this example, the name assigned to the computing device that corresponds to the source identification at that time was john/john-tablet.acme.net. In some example, destination identification may further include a name assigned to computing device that corresponds to the destination identification at that time. In this example, the name assigned to the computing device that corresponds to the destination identification at that time was nub/nub.acme.net.

Protocol column 1010 shows acronym IP for Internet Protocol V4 and acronym ICMP Ping for Internet Control Message Protocol Ping, as determined by analyzing selective fields of information in Frame 1.

Finally, summary column 1012 shows a summary of the communication transaction between the source computing device and the destination computing device. As previously described, the messages had two types, Type 8 (corresponding to Echo requests) and Type 0 (corresponding to Echo reply). Out of the 5622 messages, in this example, messages with Type 8 were 4020 packets and messages with Type 0 were 1602 packets. As previously described, each packet had 753 bytes of data. With this information, the summary of the communication transaction is further constructed.

For example, the summary column shows transmittal of 4020 packets, with 3059K payload bytes (a product of number of packets and size of the data, in this case, 753 bytes), with two unique payloads. The summary also shows receipt of 1602 packets, with 1219K payload bytes (a product of number of packets and size of the data, in this case, 753 bytes).

In this example, an average round trip time (avg rtt) is also calculated for the time period, which is shown as 7.686 ms. In this example, the average round trip time is calculated from the sum of the differences in Frame Arrival Time of the reply and request protocol message for each subgrouping of request and reply messages based on sequence number match (when both are present in the subgrouping) and the count of such subgrouping.

For example, for Frame 1 and Frame 2 as described above for packet of information 1100 and packet of information 1200, the first subgroup (corresponding to sequence number 1), would contribute May 12, 2017 11:38:05.975449000 PDT (line 061 of Frame 2)–May 12, 2017 11:38:05.9727920000 PCT (line 002 of Frame 1)=3 (2.657, rounded up) milliseconds to the sum and 1 to the count of subgroups.

In some examples, the packet of information 1100 may be summarized in a row of the summary activity report, without a corresponding matching packet of information. For example, the security appliance may not find a matching packet of information that corresponds to packet of information 1100, within a predefined threshold value of TV2. In other words, no Echo (ping) reply messages were received for Echo (Ping) request messages. In yet another example, the security appliance may not find a matching packet of information that corresponds to packet of information 1200, within a predefined threshold value of TV2. In other words, Echo (ping) reply messages were received but there were no corresponding Echo (Ping) request messages.

Figure 13B:
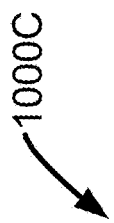

Referring to FIG. 13B, another example summary activity report 1000C is shown. Summary activity report 1000C is similar to summary activity report 1000B shown in FIG. 13A. The summary activity report 1000C in column 1002 shows the start time, column 1004 shows end time, column 1006 shows source computing device, column 1008 shows destination computing device, column 1010 shows the protocol and column 1012 shows the summary.

Referring to row 1032, summary activity report for packet of information 1100 is shown, when there is no corresponding matching packet of information that corresponds to packet of information 1100, within a predefined threshold value of TV2. In other words, no Echo (ping) reply messages were received for Echo (Ping) request messages.

Based on various selective information extracted from packet of information 1100, various columns of activity report 1000C table shown in FIG. 13B is populated as shown in row 1032. For example, referring to row 1032 of FIG. 13B, we notice that Start time corresponds to the Arrival Time of Frame 1. End time also corresponds to the Arrival Time of another frame that is similar to Frame 1, at the end of the threshold time TV2. In this example, the threshold time is about 30 seconds. The End time in this example is May 12, 2017 11:38:37.150007000 PDT.

In this example, Source, Destination and protocol information is selectively extracted and populated, as previously described with reference to row 1030 of activity report 1000B table shown in FIG. 13A.

Finally, summary column 1012 shows a summary of the communication transaction between the source computing device and the destination computing device. As previously described, the messages had two types, Type 8 (corresponding to Echo requests) and Type 0 (corresponding to Echo reply). Messages with Type 8 were 4020 packets. There were no messages with Type 0. As previously described, each packet had 753 bytes of data. With this information, the summary of the communication transaction is further constructed.

For example, the summary column shows transmittal of 4020 packets, with 3059K payload bytes (a product of number of packets and size of the data, in this case, 753 bytes), with one unique payload. Only one unique payload is shown as there were no corresponding Echo (ping) reply received in this example. The summary also shows receipt of 0 packets, with 0 payload bytes.

In this example, an average round trip time (avg rtt) is not shown, as there were no matching packets of information.

Referring to row 1034, summary activity report for packet of information 1200 is shown, when there is no corresponding matching packet of information that corresponds to packet of information 1200, within a predefined threshold value of TV2. In other words, no Echo (ping) request messages were received or identified for Echo (Ping) reply messages.

Based on various selective information extracted from packet of information 1100, various columns of activity report 1000C table shown in FIG. 13B is populated as shown in row 1034. For example, referring to row 1034 of FIG. 13B, we notice that Start time corresponds to the Arrival Time of Frame 2. End time also corresponds to the Arrival Time of another frame that is similar to Frame 2, at the end of the threshold time TV2. In this example, the threshold time is about 30 seconds. The End time in this example is May 12, 2017 11:38:37.450308000 PDT.

In this example, Source, Destination and protocol information is selectively extracted and populated, using information from Frame 2. This selection and extraction of information is similar to selection and extraction from Frame 1, as previously described with reference to row 1030 of activity report 1000B table shown in FIG. 13A.

Finally, summary column 1012 shows a summary of the communication transaction between the source computing device and the destination computing device. As previously described, the messages had two types, Type 8 (corresponding to Echo requests) and Type 0 (corresponding to Echo reply). Messages with Type 0 were 1602 packets. There were no messages with Type 8. As previously described, each packet had 753 bytes of data. With this information, the summary of the communication transaction is further constructed.

For example, the summary column for row 1034 shows transmittal of 0 packets, with 0 payload bytes with no payload. The summary column also shows receipt of 1602 packets, with 1219K payload bytes (a product of number of packets and size of the data, in this case, 753 bytes). Only one unique payload is shown as there were no corresponding Echo (ping) request sent in this example. In this example, an average round trip time (avg rtt) is not shown, as there were no matching packets of information.

As one skilled in the art appreciates, various threshold values indicated in the examples above may be changed, based on the type of protocol and type of activity within a protocol. Moreover, in some examples, threshold values may be set at a higher number, and reduced based on analysis of various communication.

As one skilled in the art appreciates, the data stored in the knowledge graph table 500, connection record table 600, indicator table 700 and activity record tables 1000, 1000A, 1000B and 1000C may include additional attributes, in addition to attributes described herein. For example, the knowledge graph table 500 may include additional attributes related to various security entities like data, network, organization, device, persona (or user attributes) and application. In one example, the security entities are entities that may have attributes that may be directly or indirectly relevant from a security or threat analysis perspective.

As one skilled in the art appreciates, the security appliance 102 selectively extracts information from communication between two computing devices and builds one or more tables of useful information, for example, the knowledge graph table 500, the connection record table 600, indicator table 700 and activity record tables 1000, 1000A, 1000B and 1000C. Various entries in the knowledge graph table 500, the connection record table 600, indicator table 700 and activity record tables 1000, 1000A, 1000B and 1000C may be used by the security appliance to proactively detect various anomalies or likely threats in the network environment. Additionally, data stored in the security appliance may be advantageously used to recreate a roadmap of events that lead to a likely threat.

In some examples, one of the techniques used by malicious program attackers is to use a chain of CNAMEs and HTTP redirects to obscure the true destination of a web browser session. The activity report in some examples can help a user to follow these chains and discover if any malicious activity is going on, for example, by reviewing the DNS queries.

In some examples, one of the methods of disguising command and control traffic for a bot network or to exfiltrate data from a compromised organization is to use the payload data of ping requests and/or replies to carry the required data. By tracking the unique payload count in an ICMP ping and generating a trigger signal if the number of payload count is above a threshold value, for further analysis. In some examples, a payload count of two or more may generate a trigger signal. As one skilled in the art appreciates, other statistics provided by the activity report may be compared to different threshold values to determine transactions that deviate from the acceptable norm, for further investigation.

Figure 14:
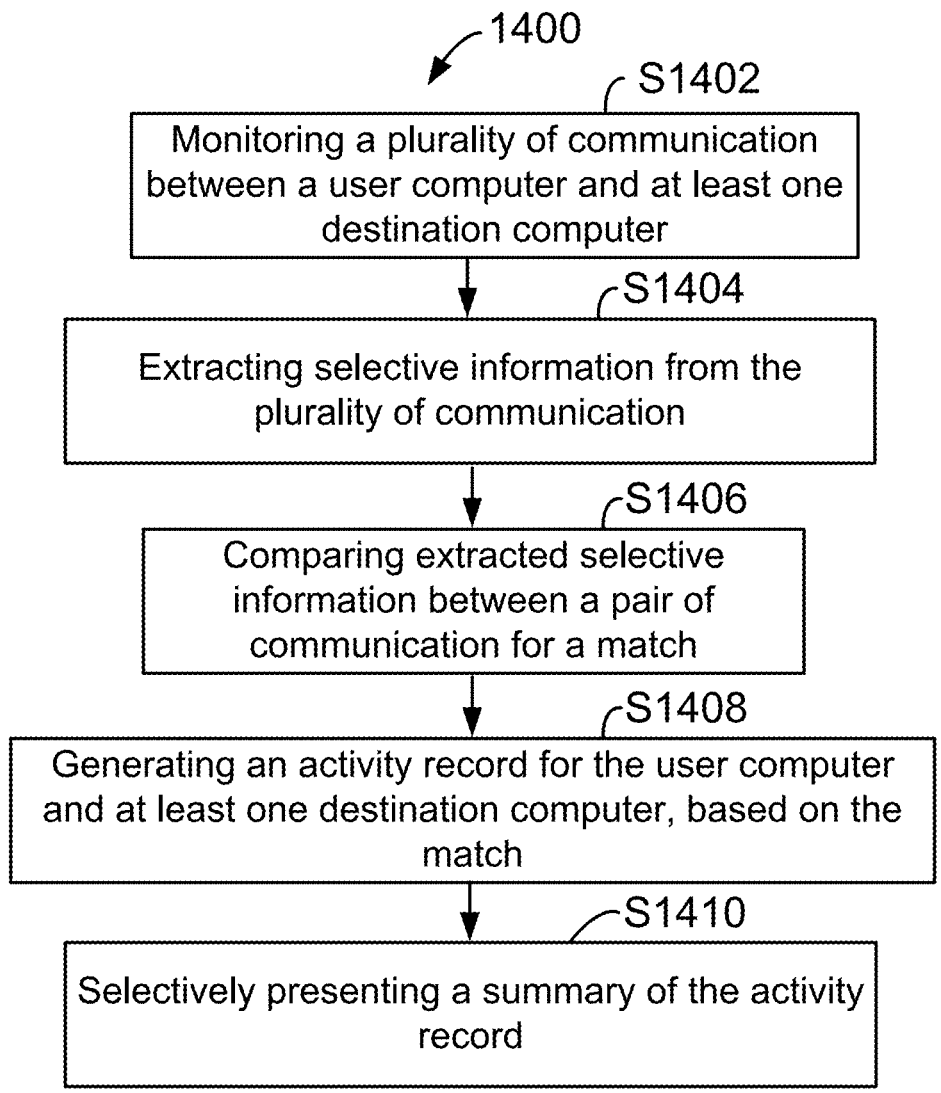
FIG. 14 shows an example flow diagram to generate an activity record.

Now, referring to FIG. 14, an example flow diagram 1400 is described. In block S1402, a plurality of communication between a user computer and at least one destination computer is monitored. In some examples, the user computer may be one or more of the user computers, for example, first user computer 104-1, second user computer 104-2 and third user computer 104-3 as shown and described with reference to FIG. 1. In some examples, the destination computing device may be one or more the servers, for example, first server 116, second server 118, third server 120 and the fourth server 112 as shown and described with reference to FIG. 1. The packet receiver 202 as previously described with reference to FIG. 2 may receive copies of packets from a network, verifies correct framing, timestamps the packets and then forwards them to the PADE module 204.

In block S1404, selective information from the plurality of communication is extracted. For example, as described with reference to security appliance 102 of FIG. 2 selective information from the packets are extracted. For example, the PADE module 204 may perform protocol decoding, for example, using the PSI module 230, PAQ module 232 and the PAM module 234.

In block S1406, extracted selective information between a pair of communication is compared for a match. For example, the PAM module 234 may perform the comparison. In some examples, comparison may be performed based on an identified protocol the packet of information conforms to, as previously described with reference to FIGS. 8, 9A, 9B, 11A, 11B, 12A and 12B.

In block S1408, an activity record for the user computer and at least one destination computer is generated based on the match. For example, extracted selective information may be grouped by one or more rules implemented in the PAM module 234 to form an activity record, as previously described with reference to FIGS. 10A, 10B, 13A and 13B. In one example, the activity record may be stored in the data buffer 206 of the security appliance. The transaction processor 210 may selectively retrieve the activity record from the data buffer 206 and store the activity record in the signal and story store 216.

In block S1410, a summary of the activity record is selectively presented. For example, as previously described with reference to FIGS. 8, 9A, 9B, 10A, 10B, 11A, 11B, 12A, 12B, 13A and 13B a summary of the activity record is selectively presented. For example, based on the protocol of the packet of information. In one example, the application programming interface 228 module may be configured to provide a programmatic interface to selectively query and retrieve activity records stored in the signal and story store 216. In one example, a user interface implemented in a web browser (not shown) may use an interface from the application programming interface 228 module to obtain selective list of activity of interest to an user and render them with a summary based on an activity specific template describing how to present the information. For example, as previously described with reference to FIGS. 10A, 10B, 13A and 13B, based on a protocol of the packet of information, a summary of the activity record may be selectively presented to a user.

Figure 15:
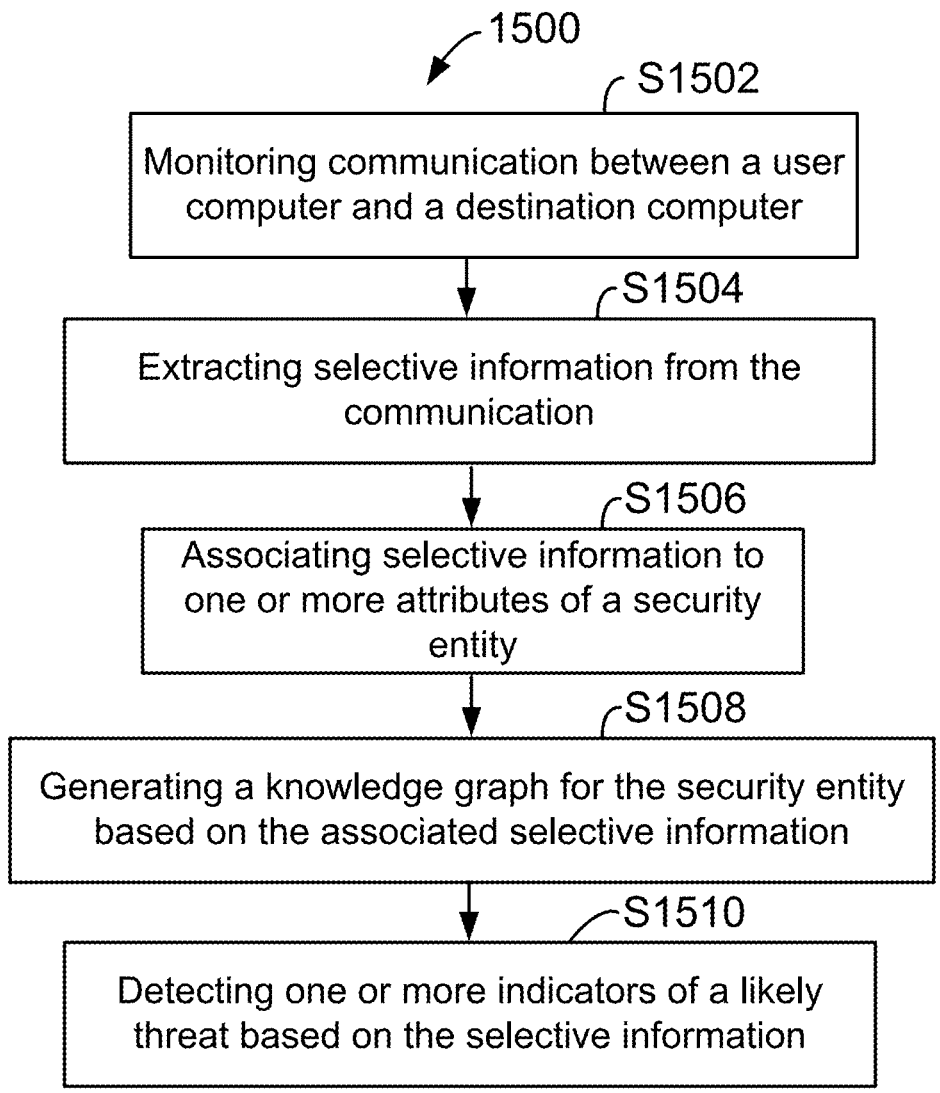
FIG. 15 shows an example flow diagram to detect one or more indicators of a likely threat, according to an example of this disclosure.

Now, referring to FIG. 15 another example flow diagram 1500 is described. In block S1502, communication between a user computer and a destination computer is monitored. For example, the user computer may be the victim user computer 304 and the destination computer may be a compromised server 302 as described with reference to FIG. 3. In some examples, the user computer may be one or more of the user computers, for example, first user computer 104-1, second user computer 104-2 and third user computer 104-3 as shown and described with reference to FIG. 1. In some examples, the destination computing device may be one or more the servers, for example, first server 116, second server 118, third server 120 and the fourth server 112 as shown and described with reference to FIG. 1.

In block S1504, selective information from the communication is extracted. For example, as described with reference to security appliance 102 of FIG. 2 selective information from the packets are extracted.

In block S1506, selective information is associated with one or more attributes of a security entity. For example, table 400 of FIG. 4 shows various information exchanged in network session, between two computing devices. Selective information from the network session is associated with one or more attributes of a security entity. For example, various entries in the connection record table 600 of FIG. 6 shows association of one or more attributes of a security entity. As an example, referring to row 616 of table 600, a security entity with a source IP address of 1.1.1.2 communicated with another security entity with a destination IP address of 2.2.2.2, using DHCP protocol. The row 616 further shows number of packets sent, size of the packet sent, number of packets received and size of the packet received.

In block S1508, a knowledge graph is generated for the security entity based on the associated selective information. For example, referring to table 500 of FIG. 5, a knowledge graph table is generated. As an example, referring to row 516 of the knowledge graph table 500, a security entity with a device IP address of 1.1.1.2 was "second user computer". And, during session S2 at time T50, the IP address of 1.1.1.2 was assigned. As another example, referring to row 518 of the knowledge graph table 500, at time T51, during session S3, the second user computer with an IP address of 1.1.1.2 was booted.

In block S1510, one or more indicators of a likely threat is detected based on the selective information. For example, one or more indicators of a likely threat are stored in the indicator table 700 of FIG. 7. As an example, referring to row 620, during session S4, security entity with an IP address of 1.1.1.2 communicated with another security entity 200.1.1.1 using an unknown protocol. As the protocol of the communication was unknown, an entry is created in the indicator table, as shown in row 712 of table 700 with selective information from the communication. For example, time (T51), session (S4), source IP (1.1.1.2), destination IP (200.1.1.1) and an indicator of likely threat (Unknown Protocol). Additionally, as shown in row 714 of table 700, another entry is created indicating that at time T51, during session S4, security entity with a source IP of 1.1.1.2 booted up. As previously described, entries 712 and 714 may together indicate that security entity with a source IP of 1.1.1.2 may be communicating with a CnC server with a destination IP of 200.1.1.1. Further, based on row 518 of the knowledge graph table 500, the source IP of 1.1.1.2 is associated with second user computer.

As one skilled in the art appreciates, the security appliance 102 may analyze various entries in the knowledge graph table 500, connection record table 600, indicator table 700 and activity record table 1000, 1000A, 1000B and 1000C to identify likely threat to a security entity.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for evaluating communication between a plurality of computing devices, comprising:
    monitoring a plurality of communication between a user computer and at least one destination computer by a security appliance;
    extracting selective information from the plurality of communications between the user computer and the at least one destination computer by the security appliance;
    comparing extracted selective information between a pair of communication between the user computer and the at least one destination computer for a match by the security appliance; and
    generating an activity record for the user computer and the at least one destination computer, based on the match between the pair of communication between the user computer and the at least one destination computer by the security appliance, the activity record indicative of a time based interaction between the user computer and the at least one destination computer.

2. The method of claim 1, further including, determining a protocol for a first communication and identifying a second communication based on a match between the determined protocol and protocol for the second communication.

3. The method of claim 2, further including comparing selective information from the first communication and the second communication based on the determined protocol.

4. The method of claim 3, wherein, the determined protocol is an UDP protocol.

5. The method of claim 3, wherein, the determined protocol is an ICMP protocol.

6. A system to evaluate communication between a plurality of computing devices, comprising:
    a security appliance configured to
        monitor a plurality of communication between a user computer and at least one destination computer by a security appliance;
        extract selective information from the plurality of communications between the user computer and the at least one destination computer by the security appliance;
        compare extracted selective information between a pair of communication between the user computer and the at least one destination computer for a match by the security appliance; and
        generate an activity record for the user computer and the at least one destination computer, based on the match between the pair of communication between the user computer and the at least one destination computer by the security appliance, the activity record indicative of a time based interaction between the user computer and at least one destination computer.

7. The system of claim 6, wherein the security appliance determines a protocol for a first communication and identifies a second communication based on a match between the determined protocol and protocol for the second communication.

8. The system of claim 7, wherein the security appliance compares selective information from the first communication and the second communication based on the determined protocol.

9. The system of claim 8, wherein, the determined protocol is an UDP protocol.

10. The system of claim 8, wherein, the determined protocol is an ICMP protocol.

11. The method of claim 2, wherein a time delay between the first communication and the second communication is greater than one second.

12. The method of claim 11, wherein the time delay between the first communication and the second communication is at least ten seconds.

13. The method of claim 11, wherein the time delay between the first communication and the second communication is at least a minute.

14. The method of claim 1, wherein the activity report includes a source identifier, wherein the source identifier includes a name for the user computer.

15. The method of claim 1, wherein the activity report includes a destination identifier, wherein the destination identifier includes a name for the destination computer.

16. The system of claim 7, wherein a time delay between the first communication and the second communication is greater than one second.

17. The system of claim 16, wherein the time delay between the first communication and the second communication is at least ten seconds.

18. The system of claim 16, wherein the time delay between the first communication and the second communication is at least a minute.

19. The system of claim 6, wherein the activity report includes a source identifier, wherein the source identifier includes a name for the user computer.

20. The system of claim 6, wherein the activity report includes a destination identifier, wherein the destination identifier includes a name for the destination computer.

* * * * *